(12) United States Patent
Chong

(10) Patent No.: US 11,622,512 B2
(45) Date of Patent: Apr. 11, 2023

(54) SYSTEM AND METHOD FOR FARMING

(71) Applicant: GREENPHYTO PTE. LTD., Singapore (SG)

(72) Inventor: Suk Shien Chong, Singapore (SG)

(73) Assignee: GREENPHYTO PTE. LTD., Singapore (SG)

(*) Notice: Subject to any disclaimer, the term of this patent is extended or adjusted under 35 U.S.C. 154(b) by 141 days.

(21) Appl. No.: 16/478,853

(22) PCT Filed: Jan. 19, 2018

(86) PCT No.: PCT/SG2018/050032
§ 371 (c)(1),
(2) Date: Jul. 18, 2019

(87) PCT Pub. No.: WO2018/136007
PCT Pub. Date: Jul. 26, 2018

(65) Prior Publication Data
US 2019/0380283 A1    Dec. 19, 2019

(30) Foreign Application Priority Data
Jan. 20, 2017    (SG) .............................. 10201700512T

(51) Int. Cl.
*A01G 9/24* (2006.01)
*A01G 9/14* (2006.01)
(Continued)

(52) U.S. Cl.
CPC ............ *A01G 9/246* (2013.01); *A01G 9/023* (2013.01); *A01G 9/143* (2013.01); *A01G 9/18* (2013.01);
(Continued)

(58) Field of Classification Search
CPC ........ A01G 31/06; A01G 9/143; A01G 9/088; A01G 24/48; A01G 9/249; A01G 9/246; A01G 9/023; G05B 19/042
(Continued)

(56) References Cited

U.S. PATENT DOCUMENTS 11,483,989 B2 * 11/2022 Ambrosi ................ A01G 31/06
11,498,774 B2 * 11/2022 Buberman ............... B25J 9/023
(Continued)

FOREIGN PATENT DOCUMENTS

| CH | 697385 B1 | 9/2008 |
|---|---|---|
| CN | 102665392 A | 9/2012 |

(Continued)

OTHER PUBLICATIONS

Written Opinion and International Search Report of International Application No. PCT/SG2018/050032, dated Apr. 4, 2018.
(Continued)

*Primary Examiner* — Yvonne R Abbott-Lewis
(74) *Attorney, Agent, or Firm* — JCIP; Joseph G. Chu; Jeremy I. Maynard

(57) ABSTRACT

The present invention relates to a system and method for farming. In particular, there is a system for indoor farming comprising at least one growth rack, the at least one growth rack comprises a plurality of cells; a plurality of farming modules, each farming module configured to be stored in a cell, each farming module configured to grow at least one type of plant; a machine arranged to move each of the plurality of farming modules in/from each of the corresponding cell; wherein each of the plurality of farming module comprises one or more self-contained nutrient tray portion specific to the type of plant, and wherein each farming module is independent with respect to other farming modules.

14 Claims, 27 Drawing Sheets

(51) Int. Cl.
| | |
|---|---|
| *A01G 9/18* | (2006.01) |
| *G05B 19/042* | (2006.01) |
| *G06N 5/02* | (2023.01) |
| *G06Q 10/087* | (2023.01) |
| *G06Q 30/0202* | (2023.01) |
| *G06Q 50/02* | (2012.01) |
| *A01G 9/02* | (2018.01) |
| *A01G 31/06* | (2006.01) |
| *B65G 1/04* | (2006.01) |
| *G05B 19/418* | (2006.01) |

(52) U.S. Cl.
CPC ............ *A01G 9/249* (2019.05); *A01G 31/06* (2013.01); *B65G 1/04* (2013.01); *G05B 19/042* (2013.01); *G05B 19/418* (2013.01); *G06N 5/02* (2013.01); *G06Q 10/087* (2013.01); *G06Q 30/0202* (2013.01); *G06Q 50/02* (2013.01); *A01G 9/247* (2013.01); *G05B 2219/2614* (2013.01)

(58) Field of Classification Search
USPC .......................................... 47/59 R, 66.6, 17
See application file for complete search history.

(56) References Cited

U.S. PATENT DOCUMENTS

| | | | | |
|---|---|---|---|---|
| 2005/0076564 | A1* | 4/2005 | Castleberry | A01G 24/48 47/59 S |
| 2007/0271840 | A1* | 11/2007 | Amberson | A01G 9/0295 47/18 |
| 2012/0054061 | A1* | 3/2012 | Fok | G06Q 30/0621 73/865.8 |
| 2012/0198766 | A1* | 8/2012 | DeBolt | A01G 9/14 47/66.7 |
| 2014/0017043 | A1 | 1/2014 | Hirai et al. | |
| 2014/0020292 | A1* | 1/2014 | Mcnamara | A01G 9/24 47/66.6 |
| 2014/0115958 | A1* | 5/2014 | Helene | A01G 31/06 47/17 |
| 2014/0259920 | A1 | 9/2014 | Wilson | |
| 2015/0282437 | A1* | 10/2015 | Ohara | A01G 7/045 47/66.6 |
| 2016/0026164 | A1* | 1/2016 | He | G06Q 20/12 700/230 |

FOREIGN PATENT DOCUMENTS

| | | | | |
|---|---|---|---|---|
| CN | 103700012 | A | 4/2014 | |
| CN | 104202965 | A | 12/2014 | |
| CN | 205813074 | U | 12/2016 | |
| CN | 205830574 | U | 12/2016 | |
| DE | 4004154 | A1 | 8/1991 | |
| EP | 0142643 | A2 | 5/1985 | |
| EP | 3326452 | A1 * | 5/2018 | ............... A01G 9/26 |
| GB | 2522756 | A * | 8/2015 | ............... A01G 7/02 |
| JP | H01256325 | A | 12/1989 | |
| JP | 2015213491 | A | 12/2015 | |
| JP | 2015223082 | A | 12/2015 | |
| KR | 101426036 | B1 * | 8/2014 | ............... A01G 7/07 |
| KR | 1020140124801 | A | 10/2014 | |
| KR | 20140141132 | A | 12/2014 | |
| KR | 1020150113457 | A | 10/2015 | |
| KR | 1864353 | B1 * | 6/2018 | ............ A01G 31/06 |
| KR | 1020130133891 | A | 12/2018 | |
| WO | WO-2011049084 | A1 * | 4/2011 | ............ A01G 31/06 |
| WO | 2013113096 | A1 | 8/2013 | |

OTHER PUBLICATIONS

International Preliminary Report on Patentability of International Application No. PCT/SG2018/050032, dated Apr. 4, 2018.
First Chinese Office Action for Application No. 201880007875.0, dated Jan. 25, 2021.
Extended European Search Report for EP18742266.2, dated Oct. 21, 2020.
Notice of Preliminary Amendment dated Oct. 27, 2022 for Korean Application No. 10-2019-7023127.

* cited by examiner

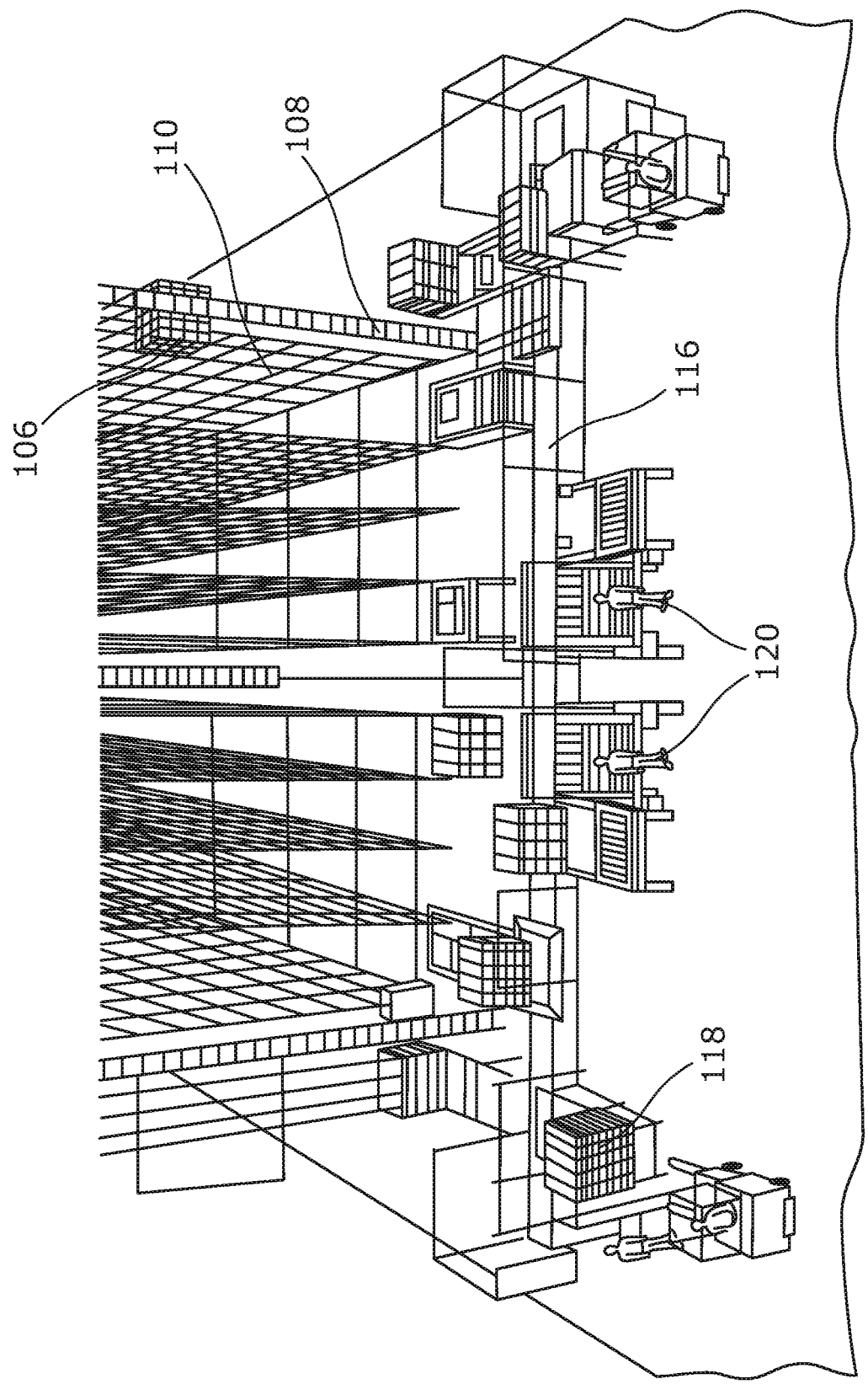

Customer Order Management
Modules/Functions

| Modules | Functions |
|---|---|
| Customer PO | • Enter customer PO<br>• Enter delivery schedule |
| Work Order | • Consolidate/Generate Work Order<br>• Monitor work order status<br>• Schedule processes |
| Capacity Check | • Check warehouse capacity |
| Equipment/Raw Materials Reservations | • Make reservations<br>• View reservations<br>• Update reservations |
| Settings | |

Fig. 8

Production Management
Modules/Functions

| Modules | Functions |
|---|---|
| Growing Plan | • Generate growing plan<br>• Generate CSV file<br>• View storage locations |
| Harvest Plan | • Generate harvest plan<br>• Generate CSV file |
| VIFS Warehouse Status | • View warehouse Status |
| Settings | |

Fig. 10

Materials/Equipment Inventory
Modules/Functions

| Modules | Functions |
|---|---|
| Material items | - Enter new items<br>- View existing items |
| Receive Materials | - Receive goods from supplier<br>- Update inventory |
| Materials Request | - View existing requests<br>- Update quests |
| Issue Materials | - Issue raw materials to request<br>- Update inventory |
| Capacity Management | - Seeding Machine<br>- Transfer Machine<br>- Packers<br>- Drivers/Vehicles |
| Settings | |

Fig. 12

Component 4: Delivery Management
Modules/Functions

| Modules | Functions |
|---|---|
| Delivery Order | • Generate DO<br>• Print DO<br>• Acknowledge DO<br>• Update Inventory |
| DO Assignment | • Assign DOs to drivers |
| Settings | |

Fig. 15

Climate Monitoring/Control

Modules/Functions

| Modules | Functions |
|---|---|
| Climate Monitoring | <ul><li>Monitor light</li><li>Monitor Temp</li><li>Monitor Humidity</li><li>Monitor CO2</li></ul> |
| Climate Control | <ul><li>Control lighting</li><li>Control Fan</li></ul> |
| Analysis/Alert | <ul><li>Set threshold values</li><li>Send email/sms to users when sensor values go beyond threshold</li></ul> |
| Settings | |

Fig. 17

Indoor Farming R&D Management
Modules/Functions

| Modules | Functions |
|---|---|
| Research Project | - Project initiation<br>- Experiments<br>- PIC |
| Research Execution | - Records |
| Research Results | - Records |
| Settings | |

Fig. 18

| Property | Value | Unit |
|---|---|---|
| Density | 7850 | kg m^-3 |
| Isotropic Secant Coefficient of Thermal Expansion | | |
| Isotropic Elasticity | | |
| Alternating Stress Mean Stress | ☐ Tabular | |
| Strain-Life Parameters | | |
| Tensile Yield Strength | 2.5E + 00 | Pa |
| Comprehensive Yield Strength | 2.5E + 00 | Pa |
| Tensile Ultimate Strength | 4.5E + 00 | Pa |
| Comprehensive Ultimate Strength | 0 | Pa |

Fig. 23(a) Cage material properties

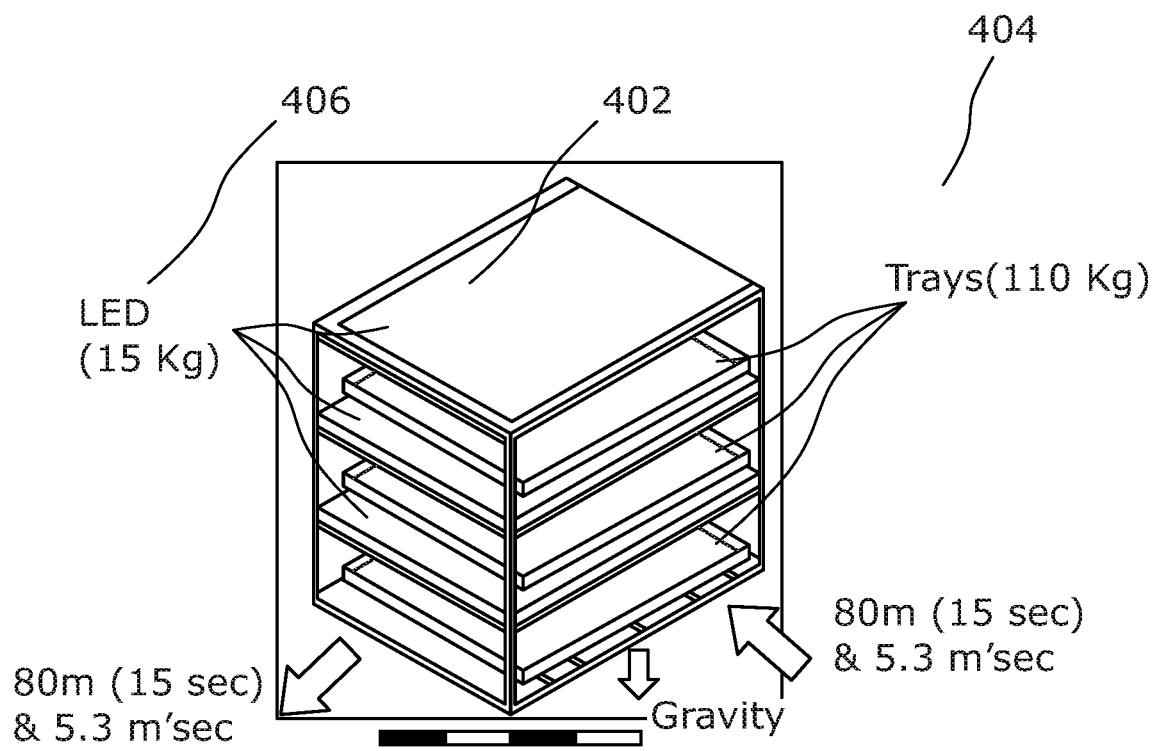

Fig. 23(b) Boundary Conditions

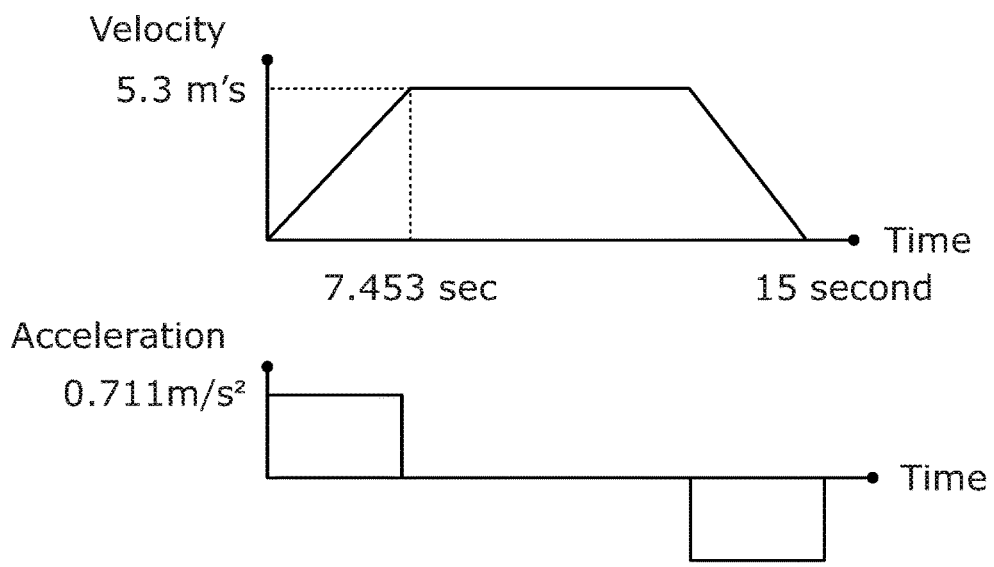
Fig. 25(a) Cage acceleration and speed
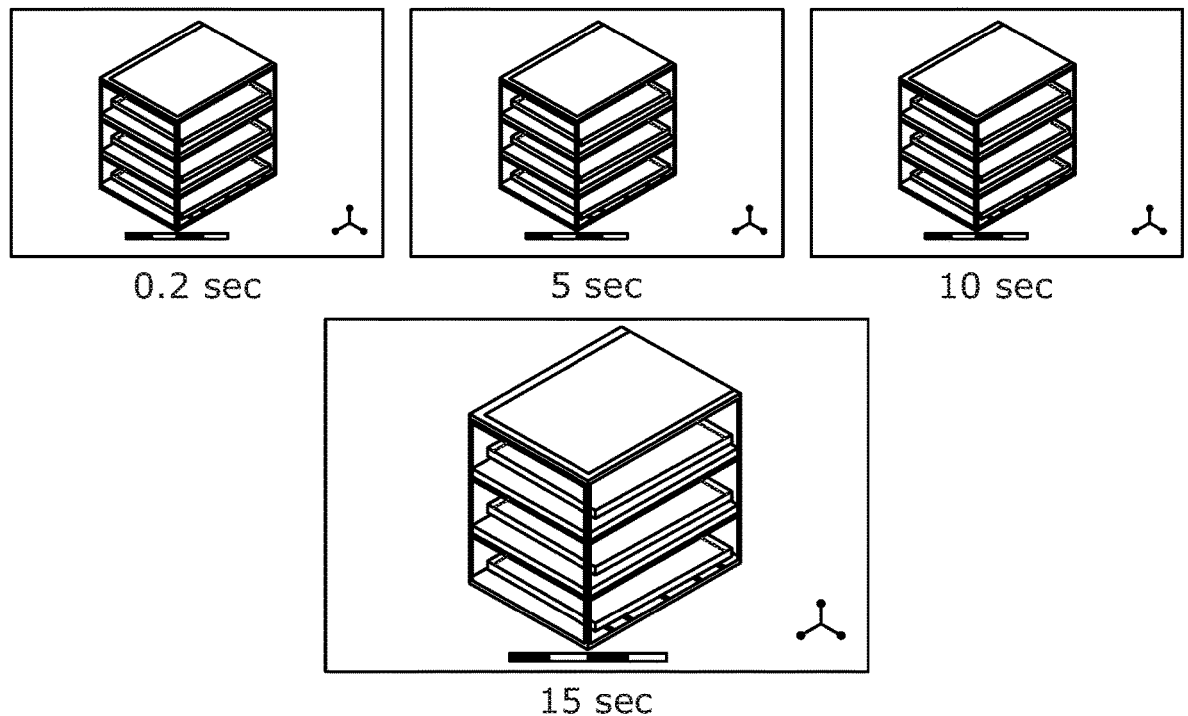
Fig. 25(b) Dynamic analysis results at cage movement cycle

SYSTEM AND METHOD FOR FARMING

FIELD OF INVENTION

The present invention relates to a system and method for farming. In particular, this system and method is suitable for, but not limited to indoor farming.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Countries that are land-scarce face the challenge of traditional vegetable farming that is land intensive. Consequently, most of the demand for vegetables is met by import. However, overdependence on imports of vegetables is non-ideal as the volume and price of vegetables are susceptible to fluctuations. Being able to produce vegetables in a land-scarce country in a space efficient manner can act as a critical buffer against sudden supply disruptions.

Another challenge of traditional vegetable farming is low productivity due to uncontrollable environmental factors and pests. These include extended periods of heavy rain or drought and diseases which can spread from other countries through wind-carrying spores, and soil damage resulting from soil erosion or contamination.

Additionally, exposure to pests such as insects can destroy the quality and yields of vegetable crops.

A further challenge of traditional vegetable farming is labor shortage. In advancing economies, fewer from the younger generation are interested in farming as a career which limits the scalability and productivity of farming.

Various farming solutions have been developed to alleviate some of the aforementioned problems. For example, 'vertical farming' solutions have been developed to address the need of land scarcity. However, such 'vertical farms' typically require a proper nutrient/water circulation system. The main downside is that such circulation system is susceptibility to the spread of plant-related disease, i.e. a diseased plant in a part of the vertical farm system could be spread to other plants within the same vertical farm system due to the circulation of fluids which carry the virus or bacteria from the diseased plant. Another disadvantage is the relatively large number of moving parts in such vertical farming solutions to support the circulation system. Outdoor vertical farming solutions are also susceptible to changes in temperature, weather, sunlight intensity etc. Furthermore in a circulation system, washing of the trays containing the farmed plants and vegetables may not be easily done, inadvertently leading to the growth of algae which may compete with the growth of these farmed produce. In hydroponic-based farming, there is a further challenge of providing constant water circulation for balancing the nutrients. Consequently, the need for water connection between hydroponic containers for water circulation limits the potential of hydroponic-based farming to scale vertically at least due to the risk of water leaking.

Therefore, there exists a need for a better solution to ameliorate the aforementioned problems.

SUMMARY OF THE INVENTION

Throughout the document, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

A technical solution to be provided is the arrangement of a plurality of farm modules, each farm module adapted to stack on top of or below or adjacent to another farm module, each farm module being self-sufficient to grow at least one type of crop or plant based on hydroponics principles which achieves a highly automated, space efficient and farm system which is less susceptible to soil-based diseases.

The innovative solution seeks to combine logistics management principles with farming solutions.

This invention seeks to provide a system and method for stacked or vertical farming. In particular, this system and method is suitable for, but not limited to, vertical hydroponics farming.

In accordance with one aspect of the invention there is a system for indoor farming comprising: at least one growth rack, the at least one growth rack comprises a plurality of cells; a plurality of farming modules, each farming module configured to be stored in a cell, each farming module configured to grow at least one type of plant; a machine arranged to move each of the plurality of farming modules in/from each of the corresponding cell; wherein each of the plurality of farming module comprises one or more self-contained nutrient tray portion specific to the type of plant, and wherein each farming module is independent with respect to other farming modules. The growth rack and cell are suited for various purposes not limited to the growing of plants and vegetables. The machine is capable of carrying, moving and/or holding the farming modules, and is not limited to any specific action. Advantageously, the multi-storey nature of the growth racks is space efficient as it allows vegetables to be grown by stacking and retrieving farming modules. The independence of the farming modules from each other omit the need to have conduits or pipes for circulation of nutrients or fluids such as water. The invention is therefore also advantageous because, without the need for pipe infrastructure, one or more dimensions between the farming cells (such as heights) may be adjustable. The farming system is hence able to accommodate for growing all sorts of horticulture and agriculture such as plants, vegetables and floral/flowers. Further, each farming module arranged independent with respect to another farming module achieves the ease of storage and retrieval by one or more machines. Moreover, the invention is advantageous because it is able to make use of an industrial storage and retrieval system in farming, combining logistical technology for the storage and movement of live produce.

In accordance with another aspect of the invention, there is a process for indoor farming, comprising the steps of sowing a seed for sprouting in a farming tray of a first farming module; storing the farming tray of the first farming module in a cell of a first growth rack; retrieving the farming tray of the first farming module from the first growth rack; transplanting a seedling from the sprouted seed to a farming tray of a second farming module; and storing the farming tray of the second farming module in a cell of a second growth rack, wherein the process includes filling each of the farming tray with liquid nutrient specific to the growth of a type of plant, and wherein each farming module is independent with respect to other farming modules. Advantageously, de-coupling the nursery and growth stage of the farming enhances space efficiency. The invention process is advantageous because it is an automated process and reduces labour costs and increases efficiency.

Other aspects of the invention will become apparent to those of ordinary skilled in the art upon review of the following description of specific embodiments of the invention in conjunction with the accompanying figures.

BRIEF DESCRIPTION OF THE DRAWINGS

The present invention will now be described, by way of example only, with reference to the accompanying drawings, in which:

FIG. 8 summarizes the functions of the various modules in FOMS for managing customer or consumer order.

FIG. 10 summarizes the functions of the various modules in FOMS for managing the production or farming process.

FIG. 12 summarizes the functions of the various modules in FOMS for managing the materials and/or equipment inventory.

FIG. 15 summarizes the functions of the various modules in FOMS for managing the delivery process of finished goods.

FIG. 17 summarizes the functions of the various modules in FOMS for monitoring and controlling the climate in the farm.

FIG. 18 summarizes the functions of the various modules in FOMS for managing indoor farming research and development.

FIG. 23 is an example of a farming module in the form of a cage, and the properties of its cage/frame.

FIG. 25 are diagrams showing the preferred cage/frame cycle movement.

DESCRIPTION OF EMBODIMENTS OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including" will be understood to imply the inclusion of a stated integer or group of integers but not the exclusion of any other integer or group of integers.

Figure 1:
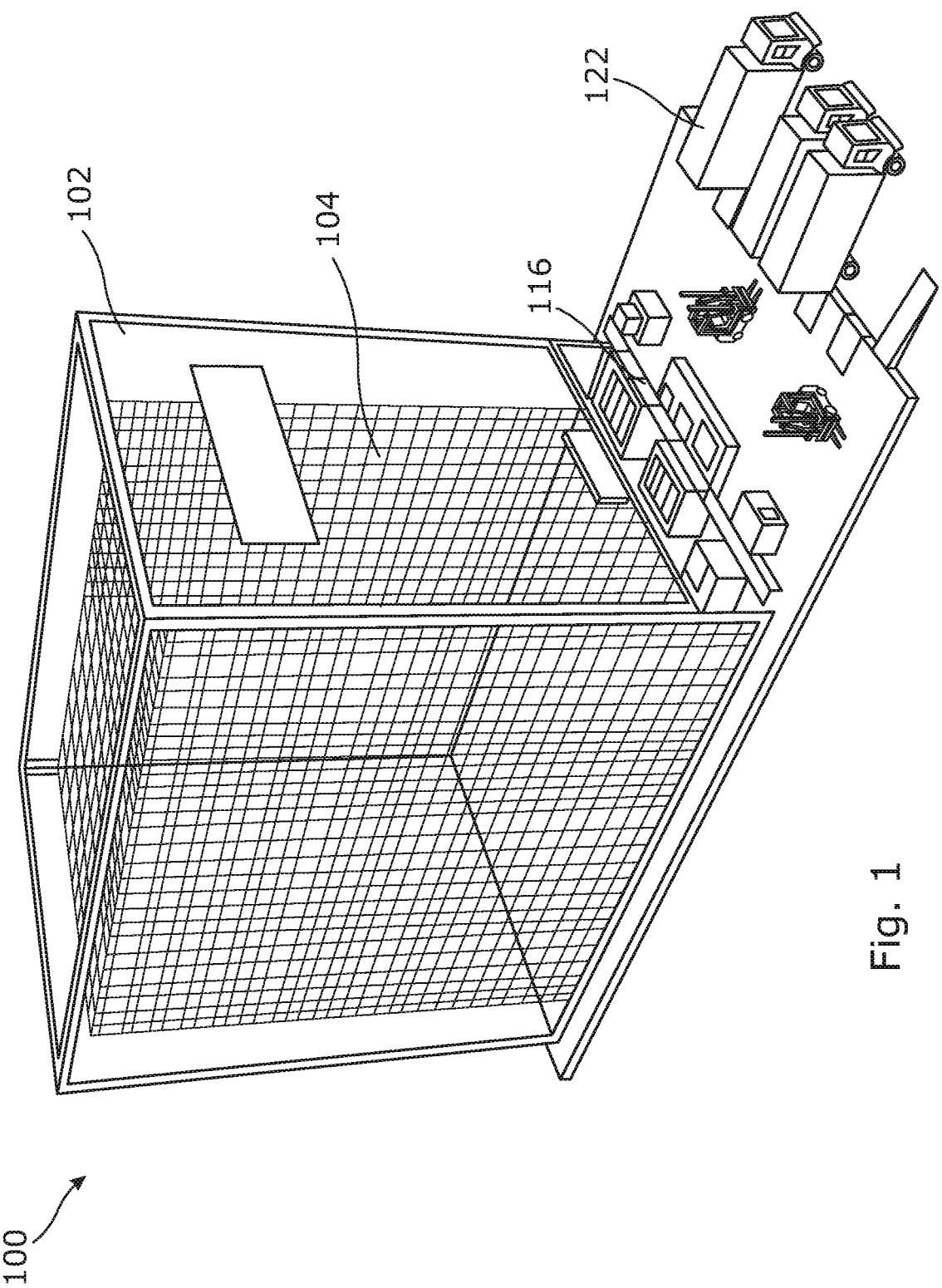
FIG. 1 shows various isometric views of a vertical farm.
Figure 1:
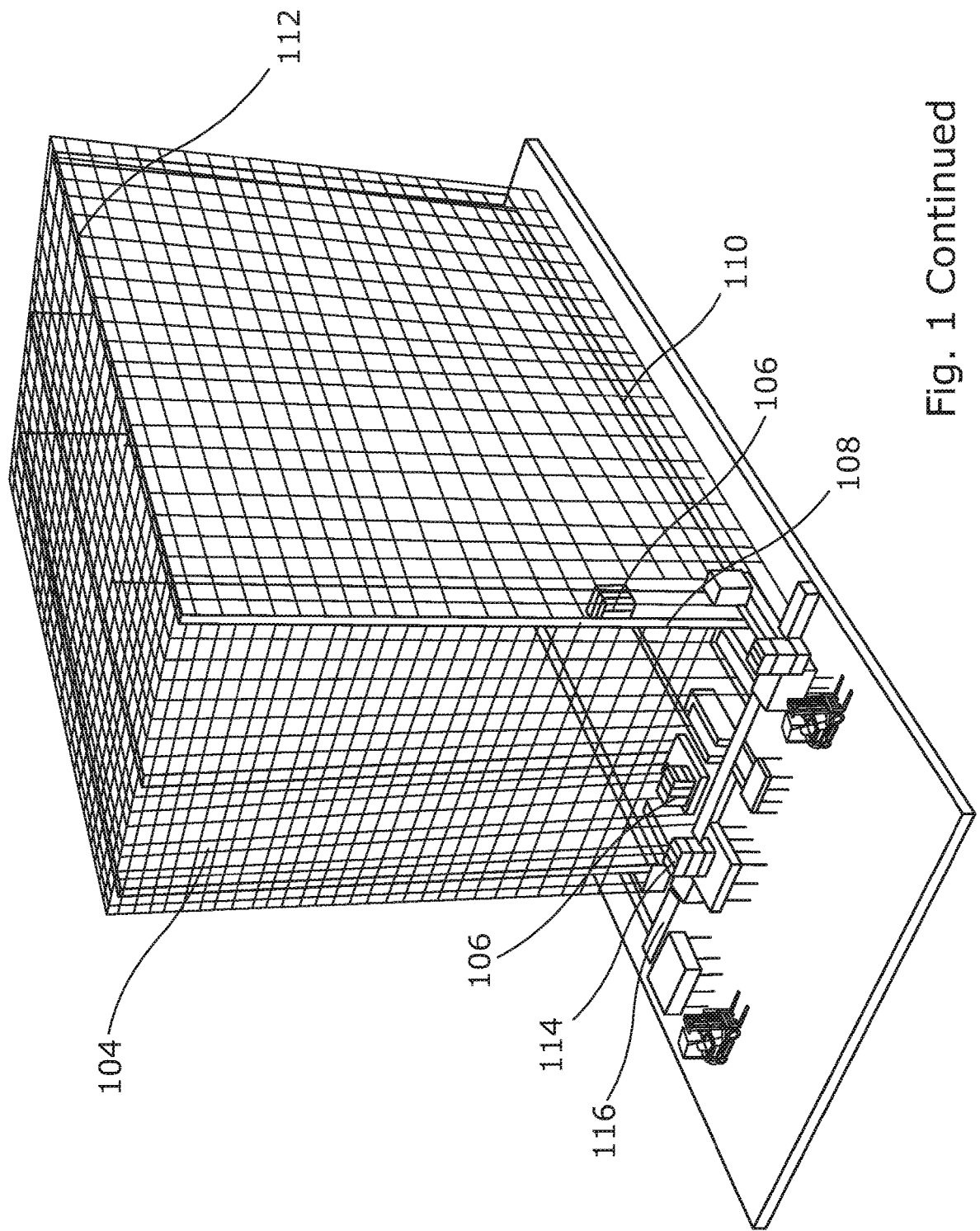

In accordance with an aspect of the invention as shown in FIG. 1, there is a farming system 100 for growing various types of plants. The farming system 100 comprises one or more growth shelves and/or one or more racks typically utilized in logistics management and is capable of being extended to a height where different types of plants, such as vegetables or fruits, may be grown in the at least one shelf and/or rack in an indoor environment. Further, the plants may be harvested in an automated manner. The growth racks are suitable for holding growth cells that allow plants to grow within and for storage and holding purposes wherein one or more types of plant or vegetables can grow.

In a preferred embodiment, the farming system 100 includes the following elements:

an automated system comprising hardware and control software of farming beds, loading and unloading of one or more farming modules, water/nutrient supply and lighting;

An environmental control system for controlling parameters such as temperature, moisture, $CO^2$/Hydrogen level control, and air ventilation; and a farm operation management system that integrates the foregoing systems and provides effective operation of the farming process within a farm.

Figure 21:
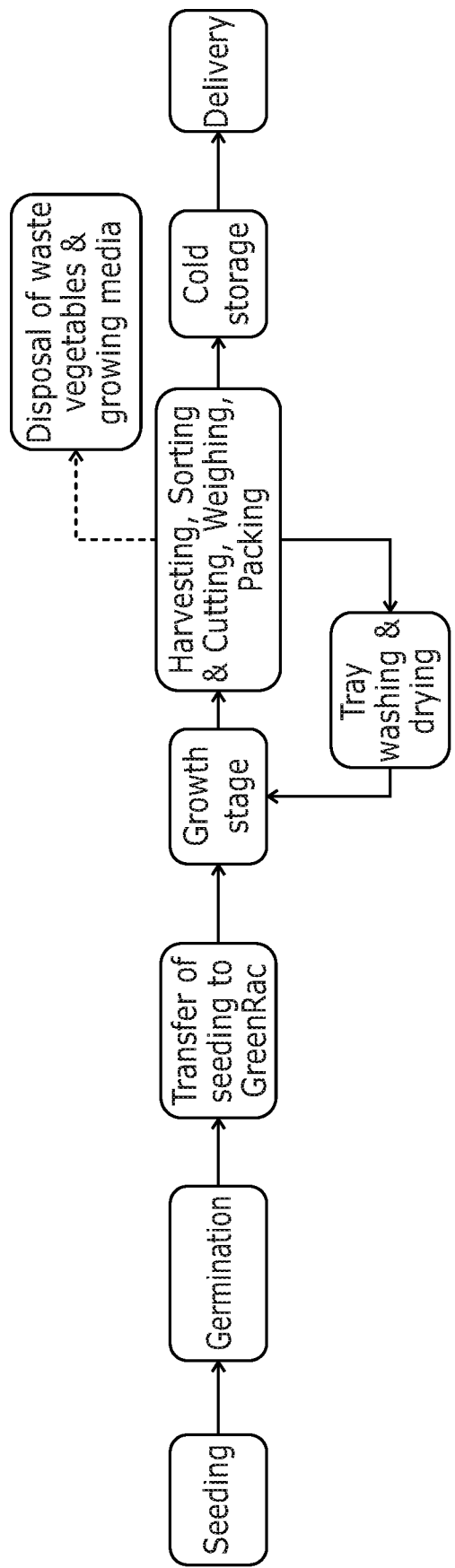
FIG. 21 is a flowchart of a vegetable farming process.

FIG. 21 shows an overview of an embodiment of the vegetable farming process of the invention.

Figure 22:
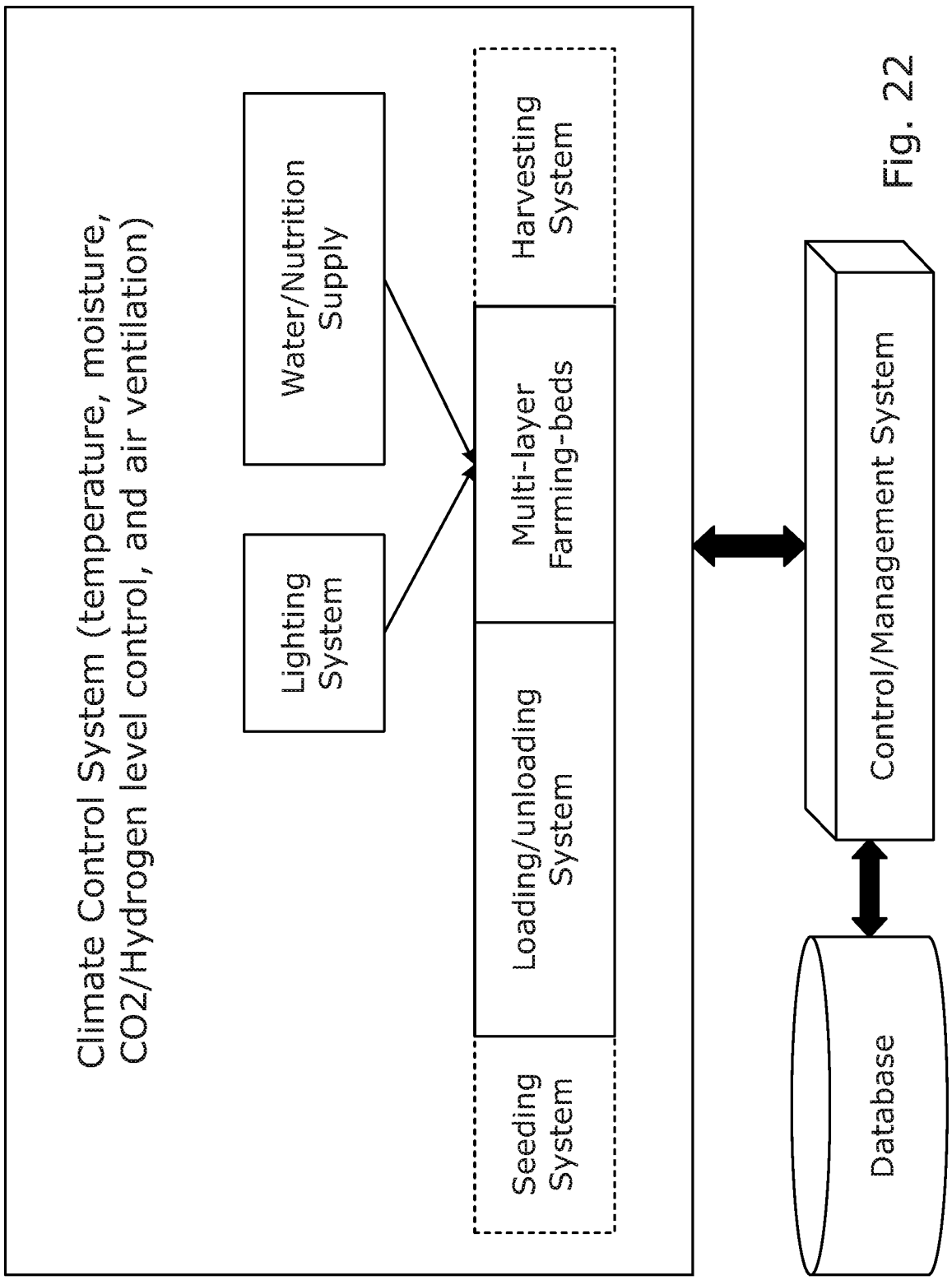
FIG. 22 is an overview of the overall farming system comprising components of a preferred embodiment of the invention.

The various elements will be described in further detail below. An overview of the farming system comprising the above elements is illustrated in FIG. 22.

The farming system 100 comprises a building or enclosure 102 which partitions or isolate the indoor environment from the outdoor environment. In various embodiments, the walls of the building or enclosure 102 may be opaque to prevent outdoor radiation from entering the building 102. Further, the walls may also be well-insulated to minimize heat exchange with the outdoor environment. The building or enclosure 102 may also be equipped with temperature regulators such as air-conditioners to provide a desired range of temperatures suitable for growing certain types of plants. The foregoing partitioning features of the walls and/or barriers allow the indoor environment to be controlled more precisely. Additionally, the walls may form a barrier against pests, or may comprise the application of chemicals, equipment or the like to disable, immobilize or kill pests.

The building or enclosure 102 may be a warehouse suitable for the storage of goods, but may be adapted to grow plants, described as follows.

The building 102 houses at least one growth rack, but typically a plurality of growth racks or shelves 104 which may be used to store farming modules 106 that are used for growing plants such as vegetables and/or fruit. In various embodiments, each growth rack 104 is elongated in the longitudinal direction of the building 102 and capable of storing a plurality of farming modules 106 along the vertical and longitudinal directions as shown in the side view of the farm layout in FIG. 2. In various embodiments, a plurality of growth racks 104 may be arranged laterally to define a 3-dimensional (3D) array of growth cells (hereinafter referred to as 'cells') along the lateral, vertical and longitudinal directions. Each cell within the 3D array may receive and store a farming module 106. Hence it is appreciable that the building 102 can correspond to a growth area which includes one or more growth racks.

Figure 2:
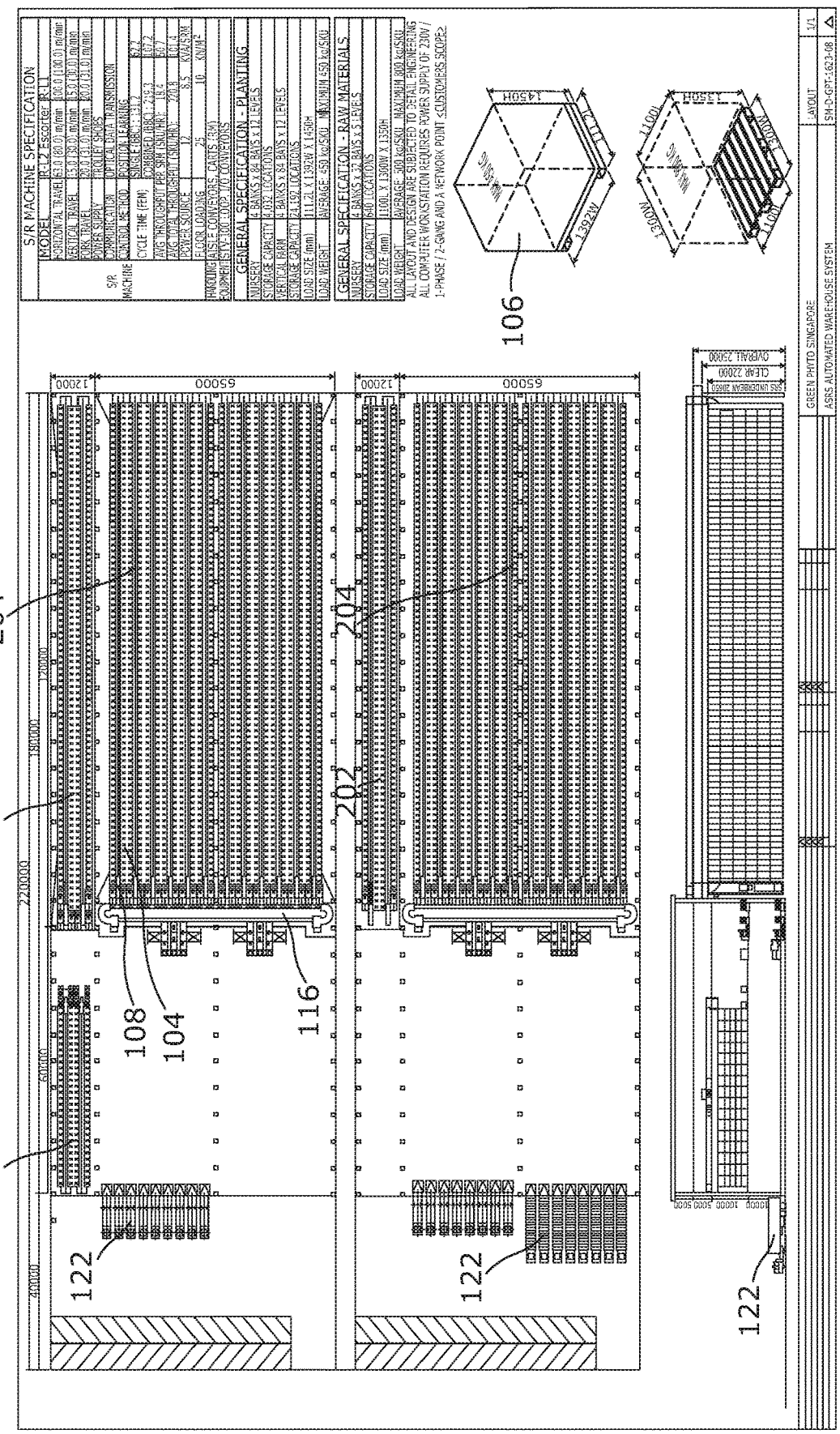
FIG. 2 is an engineering layout showing plan and side views of the vertical farm.
Figure 3:
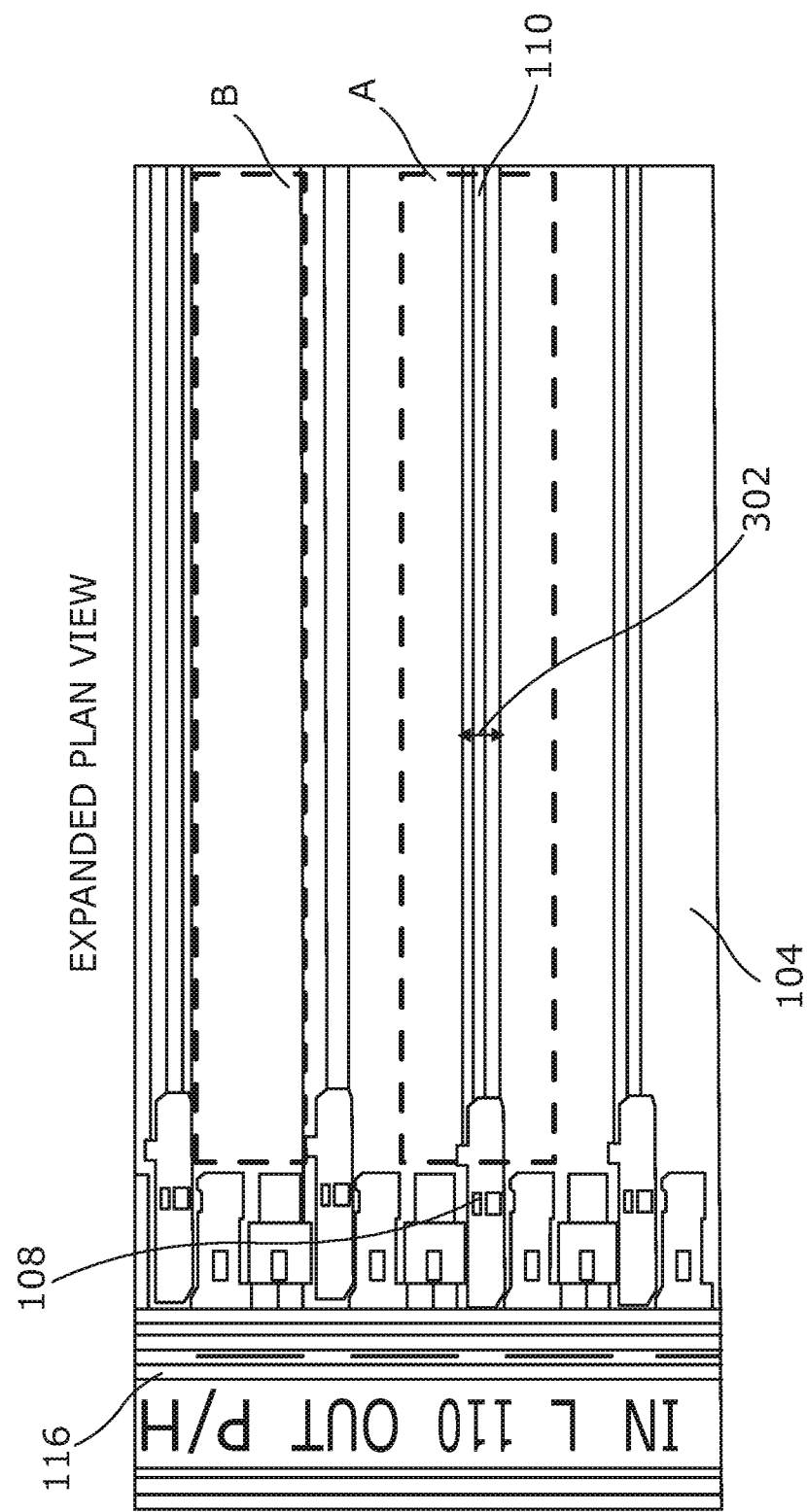
FIG. 3 is an expanded plan view of the vertical farm, showing the travelling path of a vehicle along the aisle of the growth racks.

In various embodiments, individual farming modules 106 are transported and loaded or stacked onto the growth racks 104 using one or more devices or machines 108. As shown in FIG. 1 to FIG. 3, the farming modules 106 may be transported vertically and along the longitudinal direction of the building 102 by the machine(s) 108 for loading or stacking onto various cells in the 3-D array of the growth racks 104.

In various embodiments as shown in region A of FIG. 3, one machine 108 may be used to load or stack one or more farming modules 106 onto cells in two opposing growth racks 104. In this case as shown in region A of FIG. 3, the machine 108 is moveable along an aisle separating the two opposing growth racks 104. The farming modules 106 may then be loaded sideways 302 into either one of the growth racks 104 (see double arrow on FIG. 3). To further enhance space efficiency as shown in region B of FIG. 3, two adjacent growth racks 104 are stacked abutting each other so that each growth rack 104 is not serviced by two machines 108. Advantageously, the foregoing arrangement allows the farming modules 106 to be closely packed or stacked and accessible at the same time.

In various embodiments, each aisle (and hence two growth racks 104) may be equipped with one machine 108. In other embodiments, one machine 108 may simultaneously be used for more than one aisle. In various embodiments, each machine 108 may be guided to move along the longitudinal direction of the building 102 by a bottom track 110 and a top track 112 respectively mounted on the floor and ceiling of the building 102 along the respective aisle. In some embodiments, the machine 108 may be reach stackers, forklifts or other types of transporter typically utilized in a warehouse environment. In some embodiments, the machine 108 is programmable for storage and retrieval of each farming module 106 in an unmanned and automated manner. Such automation may be realised in a way where each farming module 106 comprises an identifier indicating its position of the racks or shelves, and the machine 108 is equipped with reader(s) to scan the identifier so as to load the farming module 106 at the desired cell. The route of each machine 108 within the enclosure may be programmed.

Growth of plants may be divided into a number of stages. In particular, a seed to sprout stage, a sprout to seedling stage, and a seedling to a full grown stage. In various embodiments as illustrated in FIG. 2, the system 109 or enclosure 102 is separated into regions corresponding to the various stages of growth of the plants.

Referring to FIG. 2, the growth racks 104 may be divided into at least two different regions, a nursery region 202 and a growth region 204. The nursery region 202 is used for cultivating plants from the seeds to sprouts and/or from sprouts to seedlings. As the sprouts and seedlings are relatively smaller in size as compared to a fully grown plant, a smaller area per plant is required during the initial germination and seedling stage. As such, the nursery region 202 is relatively smaller than the growth region 204 and each rack may contain more seeds/seedlings. Thereafter, the farming module containing the germinated seeds and seedlings are further transported or transplanted to another rack/shelf to grow to maturity.

The arrangement of farming modules within the growth racks 104 for different stages may differ. For a rack of similar dimensions, it is to be appreciated that the seed to sprout stage comprises more farming modules being stacked closer to one another, compared to the seedling to full grown stage. This is because the farming modules at the stage of seedling to full grown requires more space for the plant to grow to maturity. By de-coupling the germination, seedling and growth stages, productivity is be enhanced because space is optimally allocated depending on the growth stage of the vegetable. This is in contrast to traditional farming in which the seeds are initially sowed with a large inter-seed spacing in anticipation of the size of the vegetable during maturity.

In various embodiments, there may also be a third region 206 for the preparation of farming trays 404 used in various stages of the growth cycle such as during nursery or growth stage. In various embodiments, the preparation of farming trays 404 may include the soaking of foams with nutrients and placing or arranging the nutrients impregnated foams into the farming trays. Advantageously, preparing the farming trays in advance reduces the processing time required for transplanting the plants to the as-prepared farming trays 404 during the different stages of farming.

The vertical farming system 100 may further comprise a sorting transport vehicle (STV) loop 116 that is coupled with the respective loading platform 114 of the machine(s) 108 for serving as a loading and unloading bay for the growth racks 104. In various embodiments, the STV loop 116 may receive farming modules 106 at loading points 118 after seedlings in the nursery are transplanted and transported to the loading points 118 along the lateral direction of the building 102 to the machine 108 of their respective designated growth rack 104 in the growth region for loading. In various embodiments, the STV loop 116 may also transport farming modules 106 unloaded from the 3D array of growth racks 104 to a harvesting point 120 wherein farming modules 106 containing mature vegetables may be transported from the growth racks 104 and harvested. Thereafter, the harvested vegetables may be packaged and directly loaded onto cargo trucks 122 for distribution.

Figure 4:
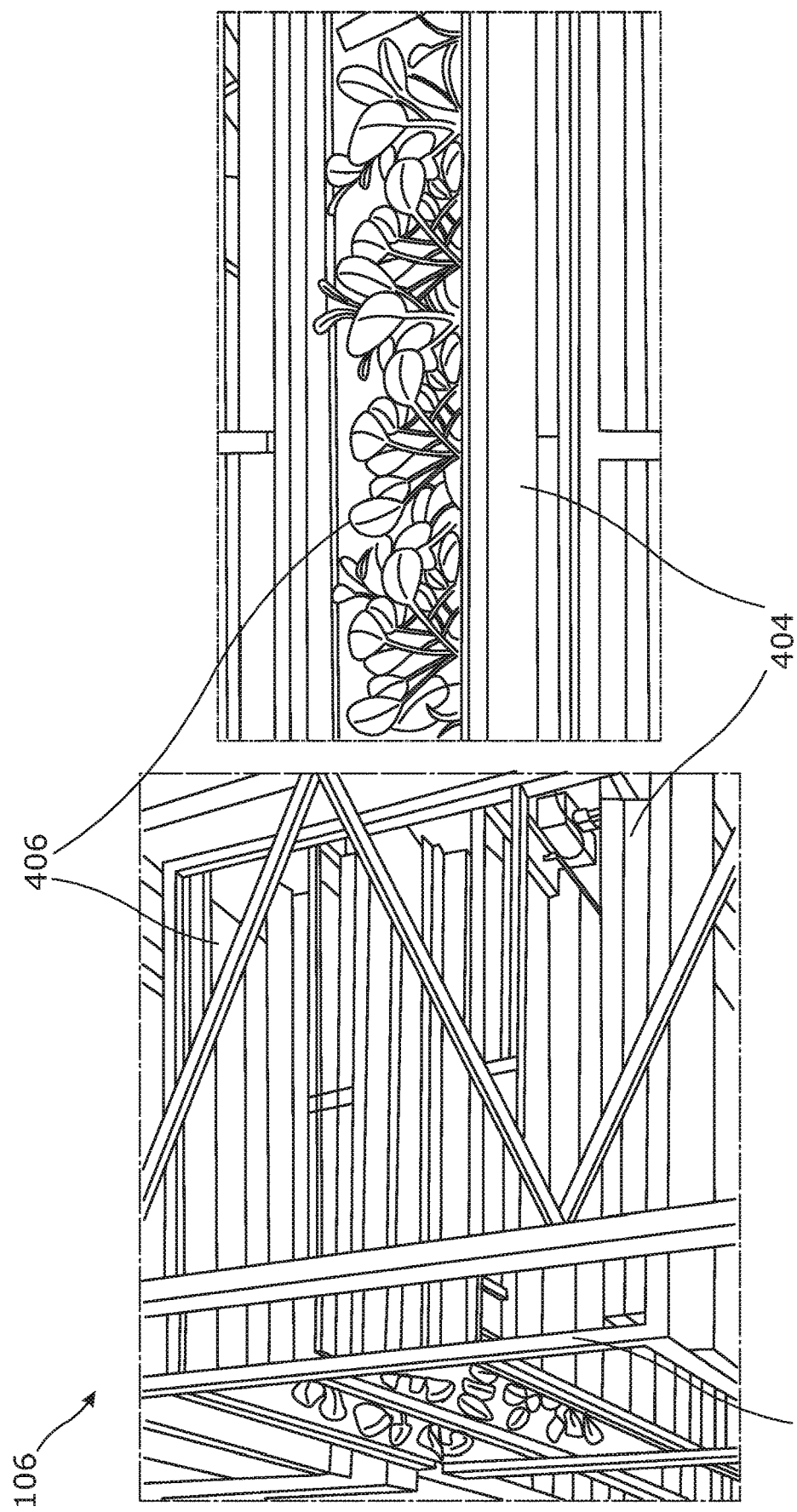
FIG. 4 shows an embodiment of the modular units comprising of growth trays and a plurality of LEDs above each growth tray.
Figure 5:
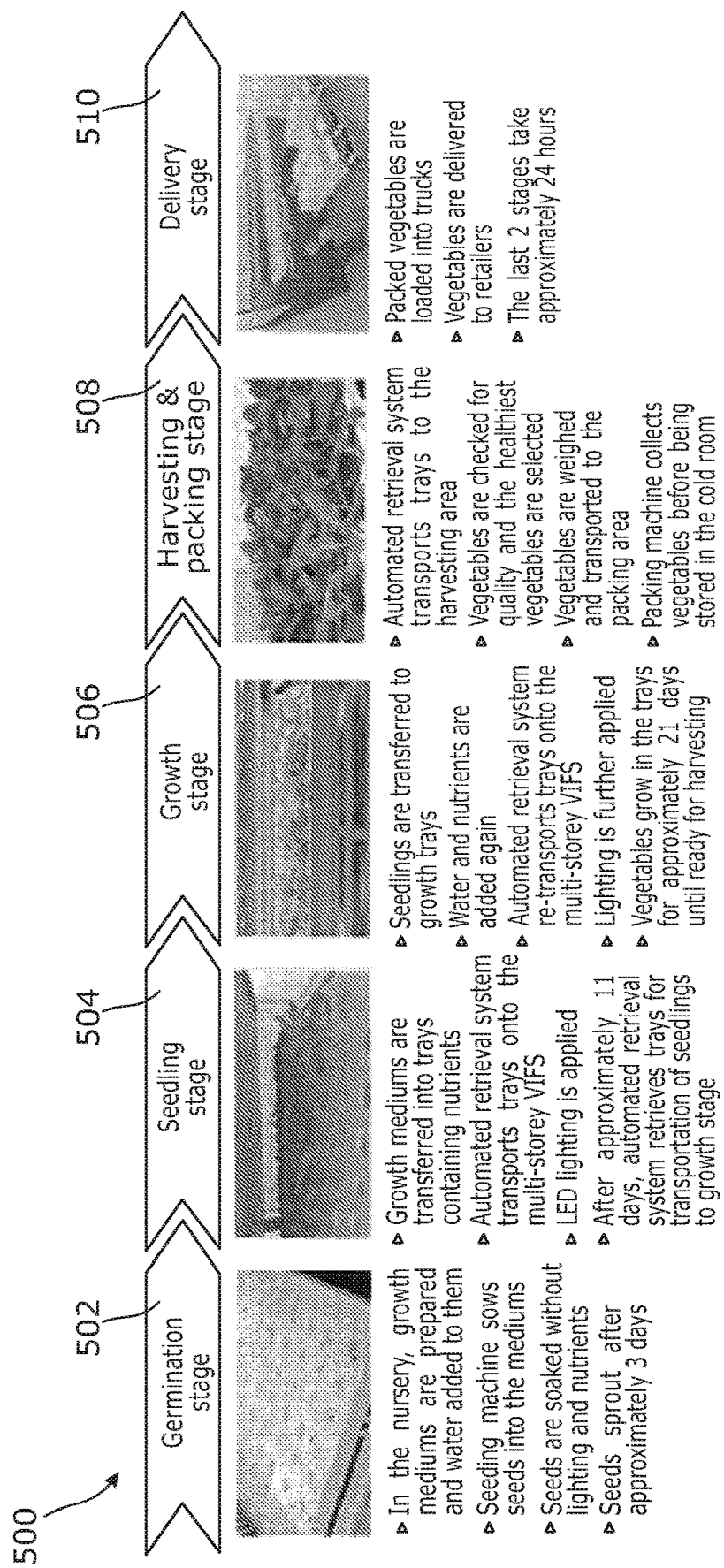
FIG. 5 shows the various steps in the process of vertical farming.
Figure 6:
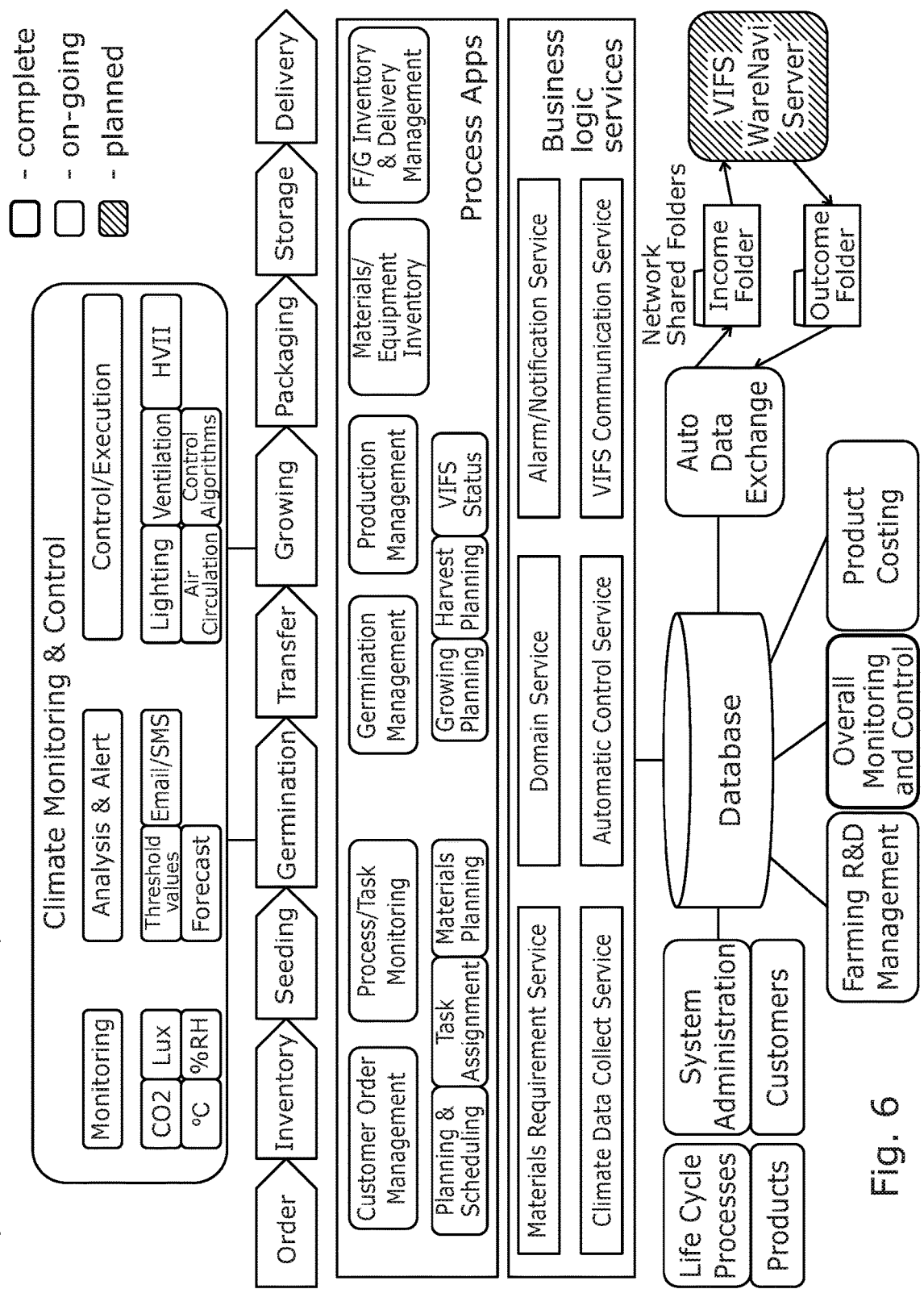
FIG. 6 schematically illustrates the integrated nature of the Farming Operation Management System (FOMS).

The layout of the farming system, not depicted, may comprise of a hall that may be partitioned into different segments. In a preferred embodiment, additionally, the hall may include a plurality of floors in which preferably each floor is preferably connected/positioned adjacent to a growth area. For example, there may be two floors, wherein one floor could be for the nursery, seeding and transplantation, serving materials to growth racks and various growth stages of the plants and vegetables to take place; while the other floor could be for harvesting and the packing of vegetables into boxes. Naturally, the invention includes other activities that could take place on these floors. This is advantageous as it optimises the space available for the farming system. In various embodiments as shown in FIG. 4, the farming modules 106 may comprise of a 3D frame 402 for supporting a plurality of farming trays 404 which are spaced vertically apart. Frame 402 may also be referred to as a cage. The vertical spacing allows sufficient space for vegetables to grow vertically at each stage of growth. In various embodiments, one or more LED lightings 406 may be installed above each farming tray 404 to provide artificial light for photosynthesis necessary for growth of the plants. The LED lighting may be pre-installed on suitable locations or positions on the cell of the growth rack/shelf 104, such as horizontal beams or bars.

In some embodiments as can be seen in FIG. 23, each farming module 106 can be made up of a cage-like frame 402 made of structural steel. The frame 402 houses the farming trays and LED lighting system. FIG. 23(a) is a table listing the material properties of the frame 402. In a preferred embodiment, as illustrated in FIG. 23(b), the total weight of three (3) trays at working condition may be around 110 kg and the lighting system is 15 kg. In some embodiments, the frame 402 may be configured to hold at least one farming tray, preferably three farming trays.

Figure 24:
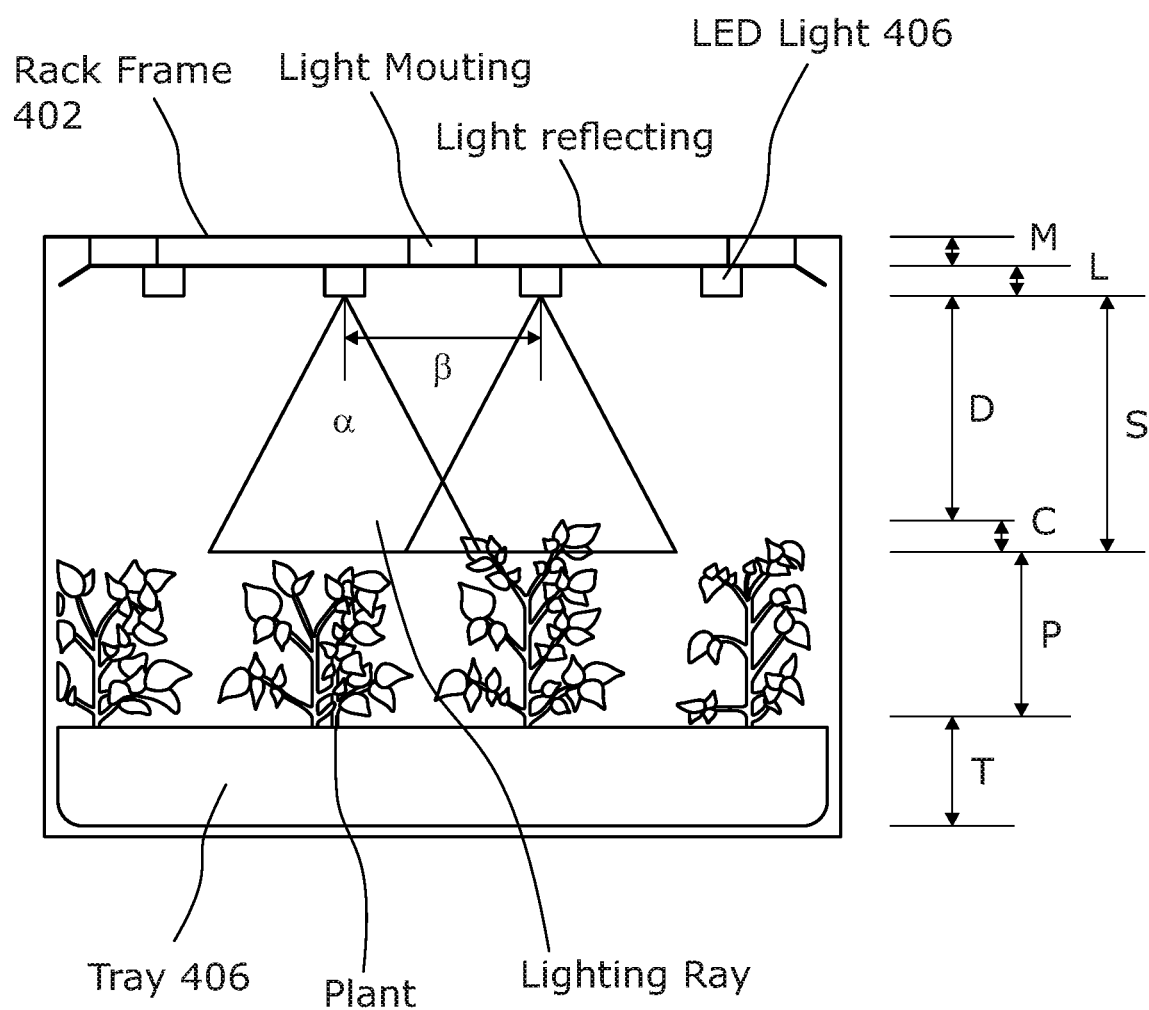
FIG. 24 is an embodiment of the design of a farming module in the form of a cage/frame.

In some embodiments, the frame 402 is loaded into a farming module 106 at the start of a growth cycle through a combination of vertical and horizontal movement at a speed of 5.3 meters/second. As such the frame 402 is subjected to both static and dynamic loading. FIG. 24 shows a preferred embodiment of the design of a frame 402.

Each frame 402 is designed to house 3 to 4 trays 404 vertically. The optimised space between each tray 404 is determined by the tray height, lighting system and vegetable type/size.

The lighting system determines the distance S between the lights and the average vegetable top, which can be calculated by the following equation:

$$S = D + c = \frac{\beta}{2\tan(\frac{\alpha}{2})} + c,$$

wherein $\beta$ is the distance between lights, $\alpha$ is the diffusion angle of the lights, D is the distance between lights and the designated tallest vegetable heights among the vegetables to grow, and c is the gap between the tallest and shortest vegetables among the designated types. The total height of the frame 402 for each tray is hence Height (H)=T+P+S+L+M, where T is the height of tray 404, P is the vegetable height, L is the Led lighting module height and M is the height of the LED device mounting.

In various embodiments, the distance between the LED lightings 406 and the farming tray 404 may be adjustable for controlling the intensity of light incident on the leaves of the plant. In order to power the LED lightings 406 when a farming module 106 is loaded into the growth racks 104, each farming module 106 may be installed with a first central electrical fitting that is electrically connected to the arrays of LED lightings 406. Correspondingly, the cells in the growth racks 104 are installed with a second electrical fitting for coupling with the first central electrical fitting when the farming modules 106 are loaded or mounted onto the growth racks 104 for electrical power to flow in order to activate the LED lightings and/or other electrical equipment located on the farming module 106. The first central electrical fitting and second electrical fitting may be shaped and adapted/aligned such that when a farming module 106 is inserted into the growth racks 104 for storage, the LED lightings 406 are switched on upon insertion. In various embodiments, removing or unmounting the farming modules 106 from the growth racks 104 un-couples the first central electrical fitting from the second electrical fitting and the LED lightings 406 are switched off upon unmounting.

Advantageously, the use of LED lightings 406 is energy efficient as compared to other types of light source such as fluorescent or incandescent light bulbs. Furthermore, the narrow band emission of LEDs 406 allow the spectrum of the artificial sunlight to be tuned more precisely for optimal growth of different vegetable or plant varieties. Additionally, artificial sunlight may be provided to the vegetables in a consistent manner (by pre-defining cycles of illumination) as compared to traditional sunlight which tend to varies. Advantageously, the growth rate of the plant or vegetable is increased, allowing quicker harvesting.

Figure 19:
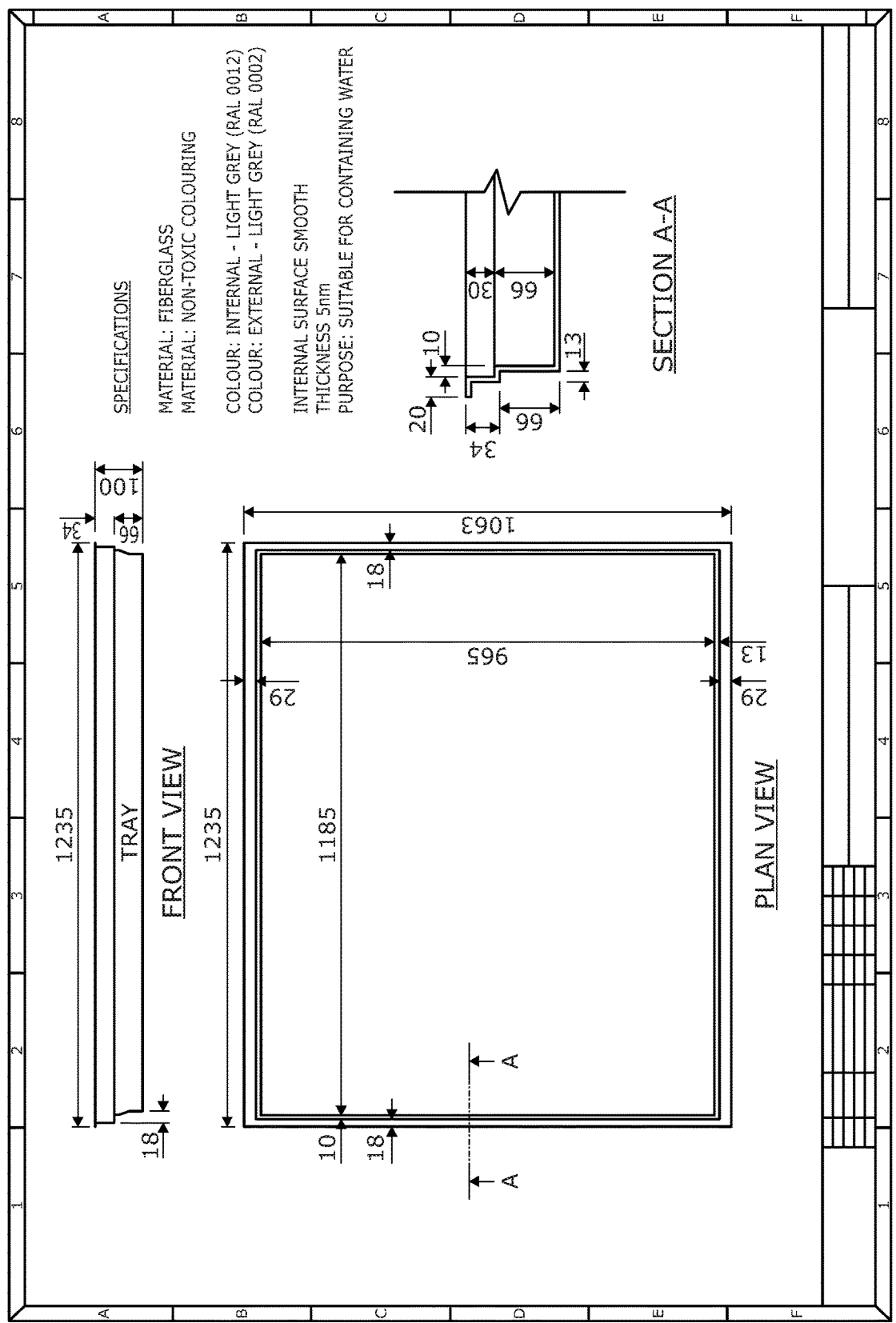
FIG. 19 is an engineering drawing illustrating the side and plan views of the self-contained or self-sufficient farming tray.
Figure 20:
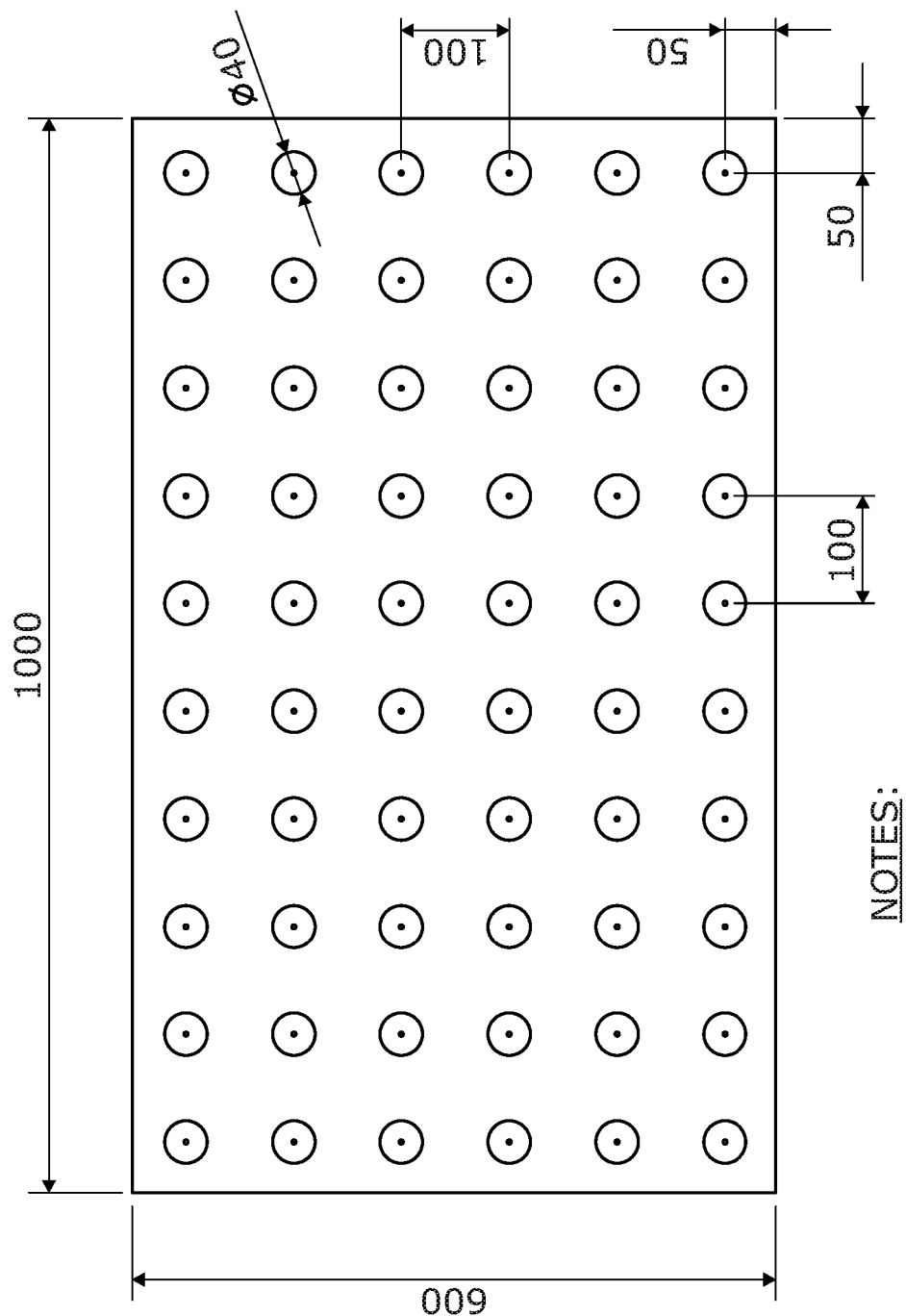
FIG. 20 is an engineering drawing illustrating the plan view of the lid or planting board.

In various embodiments, the farming trays 404 are hydroponic-based (soil-less) which eradicates the problems associated with soil-based farming. In various embodiments as shown at least in FIG. 19 and FIG. 20, each farming tray 404 may be self-contained without the need of water circulation as plants or vegetables are grown on growth medium impregnated with nutrients that are held in place within the farming tray 404 through a plurality of holes made on a planting board, wherein the planting board is fitted and held in place within the main recess of the farming tray 404. Advantageously, the self-contained nature of the farming trays 404 eradicates the need for the installation of pipes for water circulation, allowing the growth racks 104 to be scaled vertically. In various embodiments, the growth medium may be a foam. In various embodiments, the foam may be Polyurethane based. The density or porosity of the foam may be optimized or tuned for adjusting the amount of nutrients absorbed in the foam. Advantageously, the foregoing allows the foam be catered to different plant varieties.

Each nutrient loaded tray holds the nutrient liquid for vegetable growth. After the nursery vegetables are planted in the farming tray 404, a machine 108 for example is used to move the farming tray 404 inside a frame 402 to a module 106. This involves the start, acceleration, deceleration and stop in both the vertical and horizontal directions as illustrated in FIG. 25. To avoid spilling of the nutrient liquid out of the farming tray 402, the acceleration and deceleration of lifting the tray using the machine 108 is controlled. This could be done, for example, by causing the tray 402 to start moving at an acceleration rate that causes no or little relative movement between the liquid and the tray, and the momentum of the liquid is fully absorbed before the tray stops. Another example of controlling spillage of the liquid is to partition the tray 402 cavity to prevent the liquid from pilling up. This can be done by having cross partition boards in the tray, crossed ribs in the tray, using longer nursey/vegetable root sponge and adding ribs from the tray's inner bottom between the sponge lines to strengthen the effect. In various embodiments, the partitions do not need to touch the bottom of the farming trays 402.

In various embodiments as described above, there may be at least two types of farming trays 404 for the nursery stage and the growth stage. Holes may be made on the planting boards. In this regard, the hole cutouts in the lids or planting boards fitted in the main recess of the nursery farming trays 404 for holding the seeds may be spaced relatively closer as compared to the hole cutouts in the lids or planting boards for the growth stage farming trays 404.

In accordance with various embodiments of the invention, there is an automated retrieval system for automated storage and retrieval of farming modules 106 in the 3D array of growth racks 104 comprising a central processing unit (CPU) in communication with the plurality of machines 108 and STV 116. In various embodiments, the CPU keeps track of the status of every farming modules 106 in the system 100 including the stage of growth the plant in each framing module 106 is at and the location within the 3D array of growth racks 104. When a certain milestone corresponding to a stage of growth is reached (for e.g. after 10 days) for a type of plant in the farming module 106, the automated retrieval system transmits a control signal to the corresponding machine 108 to retrieve the farming module 106 from the growth racks 104 for advancement to the next production stage (for e.g. sprout to seedling or growth to harvesting stage). The CPU may comprise one or more processor servers and/or cloud servers to facilitate the implementation of the necessary logic control and control signals.

The machines 108 and STV 116 may form part of an automated storage and retrieval system (ASRS) consisting of a variety of computer-controlled systems for automatically placing and retrieving loads from defined storage locations. Retrieval of items is accomplished by specifying the farming module(s) 106 to be retrieved at a pre-determined time. The CPU determines where in the growth racks 104 the farming module 106 can be retrieved from and schedules the retrieval. The machine 108 take loads into and out of the storage area and move them to the manufacturing floor or loading docks. To store items, the pallet or tray is placed at an input station for the system, the information for inventory is entered into a computer terminal and the ASRS system moves the load to the storage area, determines a suitable location for the item, and stores the load. As items are stored into or retrieved from the racks, the computer updates its inventory accordingly.

The ASRS could be in the form of fixed aisle or vertical lift modules (VLM).

A machine 108 in a fixed-aisle ASRS can be single-masted or double-masted and supported on a track and ceiling guided at the top by guide rails or channels to ensure accurate vertical alignment. In various embodiments, the machine could be suspended from the ceiling. The machine 108 travels between fixed storage shelves to deposit or retrieve the farming modules 106. The machine moves horizontally within an aisle and are able to elevate up to the necessary height to reach the farming modules 106 located at several positions deep in the shelving.

VLMs can be built quite high to match the available overhead space in a facility. Multiple units can be places in 'pods' whereby an operator can retrieve items from one unit while the other units are moving.

The VLM is a board controlled automated vertical lift module. Inventory within the VLM is stored on front and rear tray locations or rails. When a tray is requested, either by entering a tray number in the built in control pad or by requesting a part through software, an extractor travels vertically between the two columns of trays and pulls the requested tray from its location and brings it to an access point. The operator then picks or replenishes stock and the tray is returned to its home upon confirmation. The VLM systems could be customized to fully utilize the height of the indoor. With the capability of multiple access openings on different floors, the VLM system is able to provide an innovative storage and retrieval solution. The rapid movement of the extractor as well as inventory management software can dramatically increase the efficiency of the picking process.

In some embodiments, the building or enclosure 102 is equipped with a plurality of sensors arranged in signal communication with the CPU. Non-exhaustive examples of such sensors may include carbon dioxide sensors, light sensors, thermometers and image capturing devices.

Figure 14:
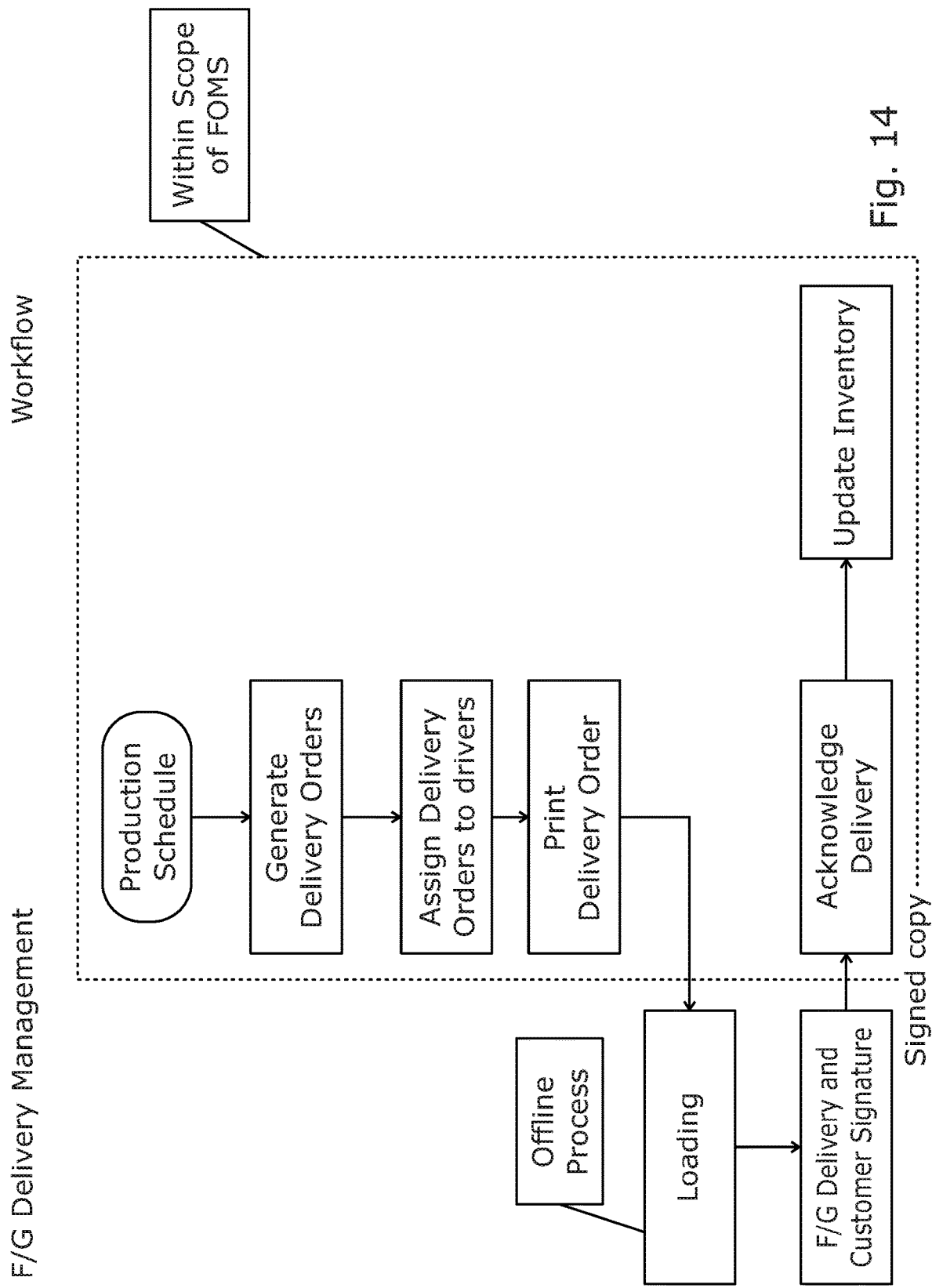
FIG. 14 is a flow chart showing the management of the delivery process of finished goods by FOMS.
Figure 16:
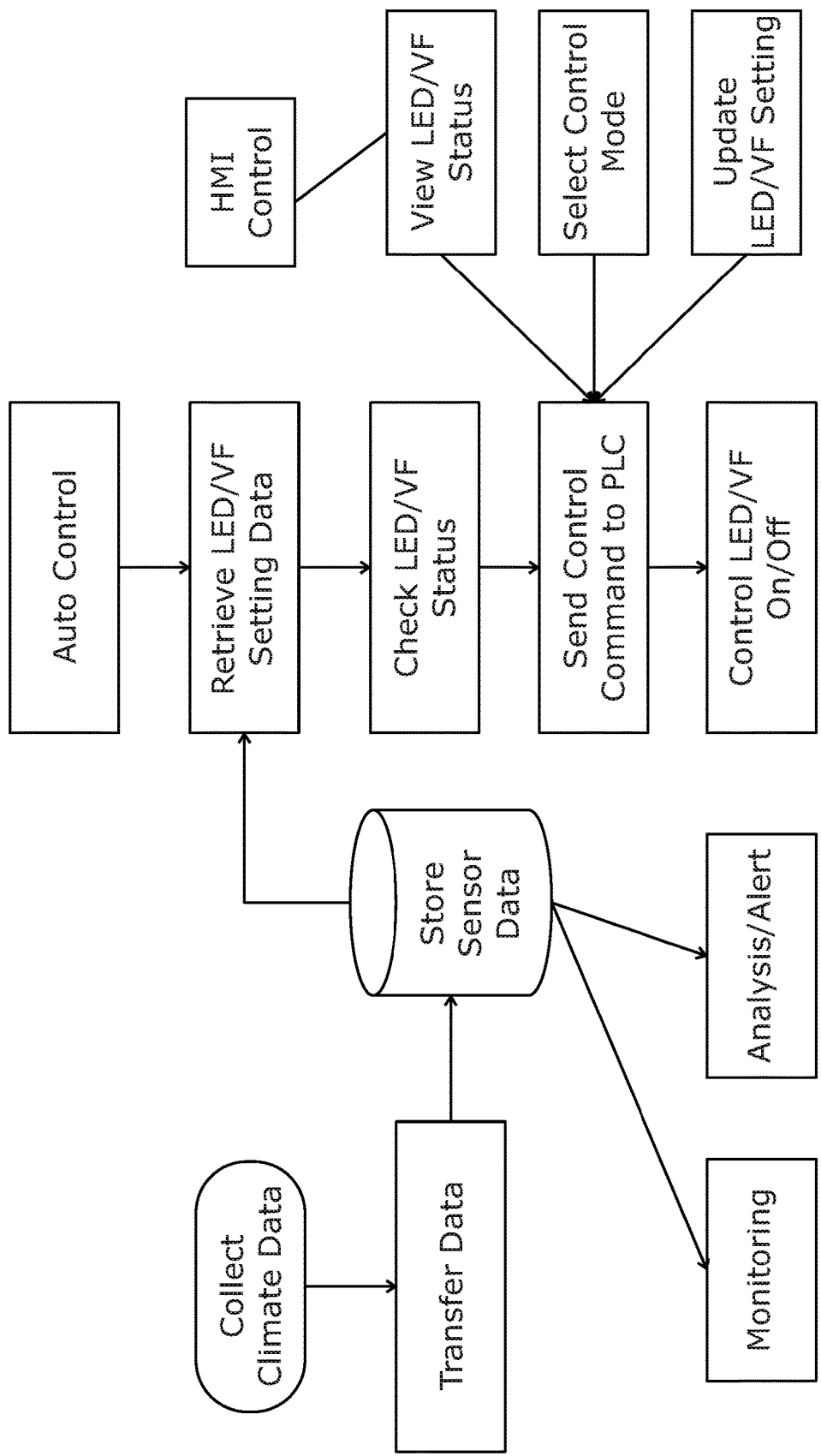
FIG. 16 is a block diagram illustrating the climate monitoring and control system within FOMS.

As shown in FIG. 16 and FIG. 14, there is a farm operating management system (FOMS) comprising of the CPU that is in signal/data communication with the plurality of sensors such as carbon dioxide sensors, light sensors, thermometers and image capturing devices. Based on the feedback information from the different sensors, the FOMS enables control of environmental factors that influence the growth of the vegetables including light intensity and colours, temperature, humidity and carbon dioxide levels. In various embodiments, the sensors are distributed spatially across the building 102 forming a network, allowing spatial variations in environment parameters or conditions be captured and monitored. Following which, FOMS may then control environmental parameters spatially to cater to different plant varieties that are growing at different regions of the building 102.

Figure 7:
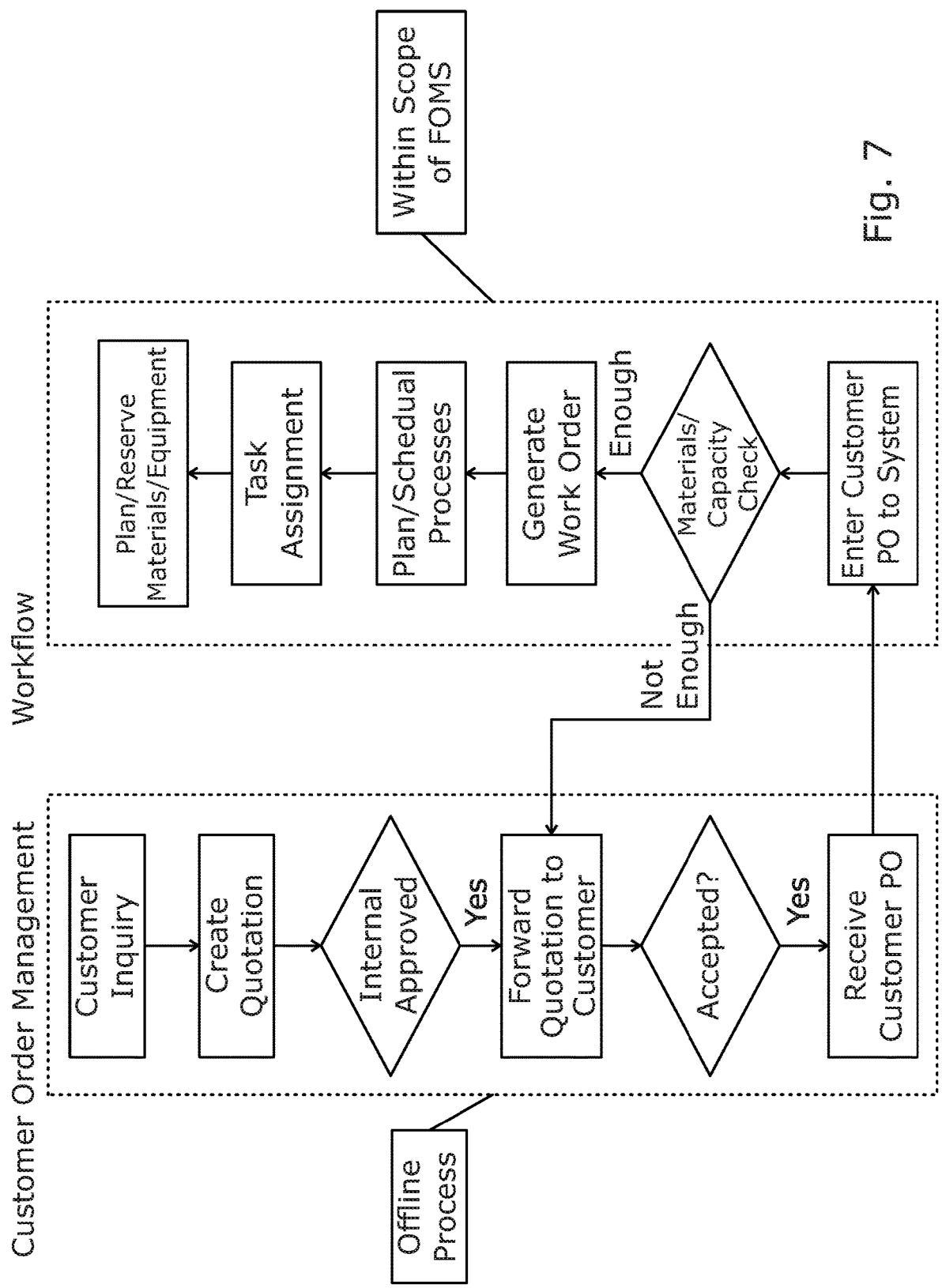
FIG. 7 is a flow chart showing the integration of upstream customer order with FOMS.
Figure 9:
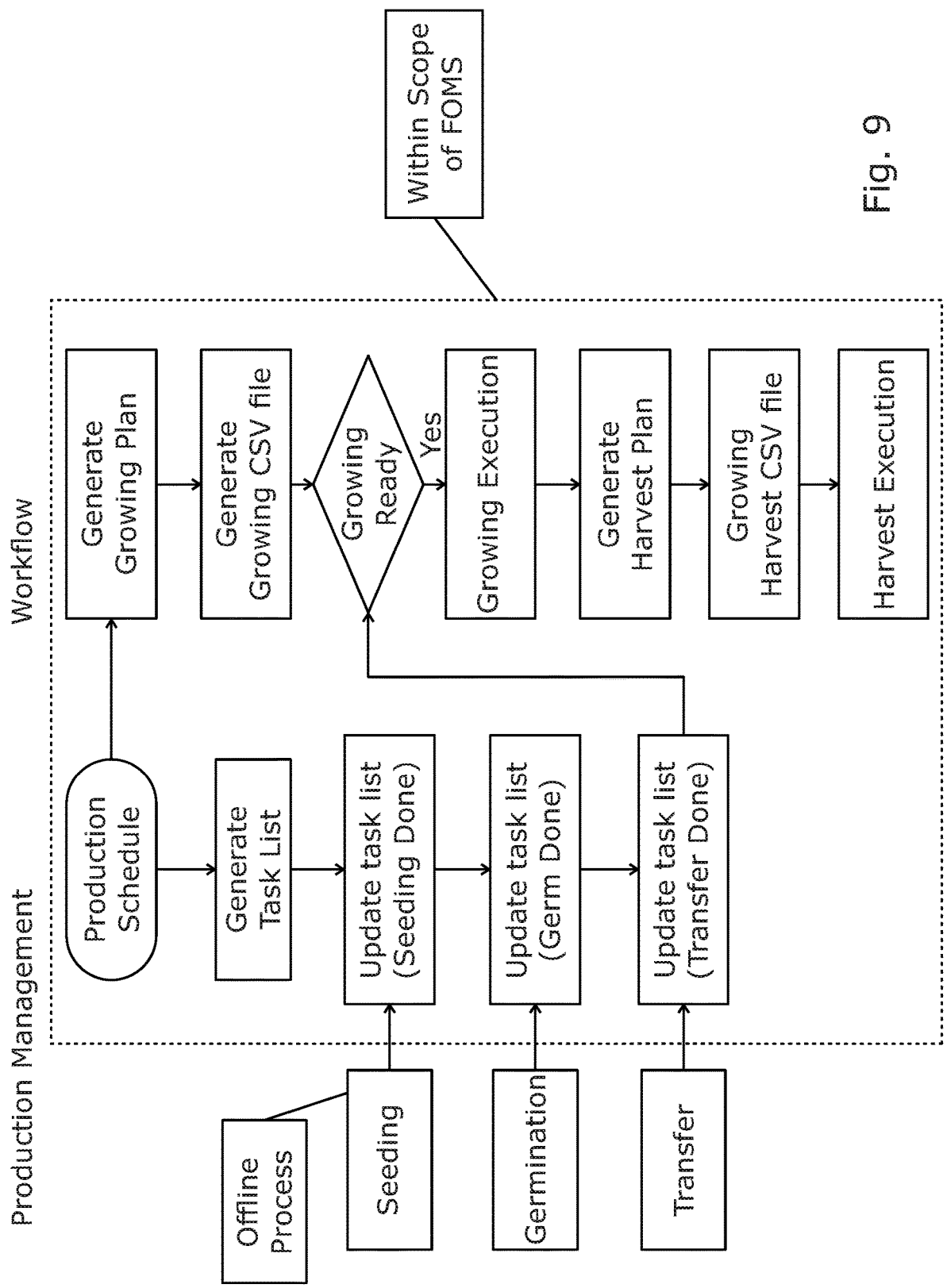
FIG. 9 is a flow chart showing the production or farming process as managed by FOMS in tandem with other offline processes.

In various embodiments as shown in FIG. 6 to FIG. 15, FOMS may also enable some form of "Intelligent Farming" by integrating the value chain or production chain of vegetable or plant farming or production, allowing farming to be managed dynamically depending on consumer demand. In various embodiments as shown in FIG. 7, FOMS may interface or communicate with a platform for consumers or customers to place order for a plant or vegetable in advance. The consumer may provide order information such as, but not limited to, the type of plant, the quantity required and delivery date. Thereafter, FOMS is operable to process the order information and verify with at least one inventory stored in a database if sufficient farming resources (for e.g. the number of farming trays 404 and raw materials required) are available to fulfil the order.

Subsequently, FOMS may allocate and reserve farming resources by generating a work order and initiate farming on a pre-determined day so that the plant may be harvested at or near the delivery date. In various embodiments, FOMS may update the at least one inventory in the database once farming resources are allocated to prevent over-subscribing of farming resources. In various embodiments, the pre-determined day to initiate farming for an order may be calculated based on at least the delivery date and growth cycle of the type of plant ordered. In various embodiments, the pre-determined day may also factor in the time taken for delivering the plant to the consumer. Once the farming or production process is completed, the plant or vegetable may be harvest at or near the delivery date and subsequently packaged and delivered to the consumer. Advantageously, it at least allows the farm to manage seasonal fluctuations in demand for plants while at the same time ensuring the quality of the delivery while maintaining a low cost.

In various embodiments, FOMS may utilize artificial intelligence to analyse historical order information from consumers for predicting future demand for plants. Advantageously, it at least enables raw materials such as seeds, nutrients and foams to be procured in anticipation of seasonal changes so that the probability of rejecting an order due to insufficient farming resources is reduced.

FOMS may function as a holistic platform that fully integrates the entire value or production chain of farming, from order taking to delivery. FOMS may be in charge of plant capacity management by updating at least one inventory in the database for allocating of farming resources. In various embodiments, a user interface, which may be in the form of a dashboard, may be provided to allow an operator visualize and monitor important parameters in the entire value chain of farming so that abnormalities may be rectified quickly. These parameters may include, but not limited to, raw materials inventory, order information from consumers, information from the network of sensors and delivery statuses.

Figure 11:
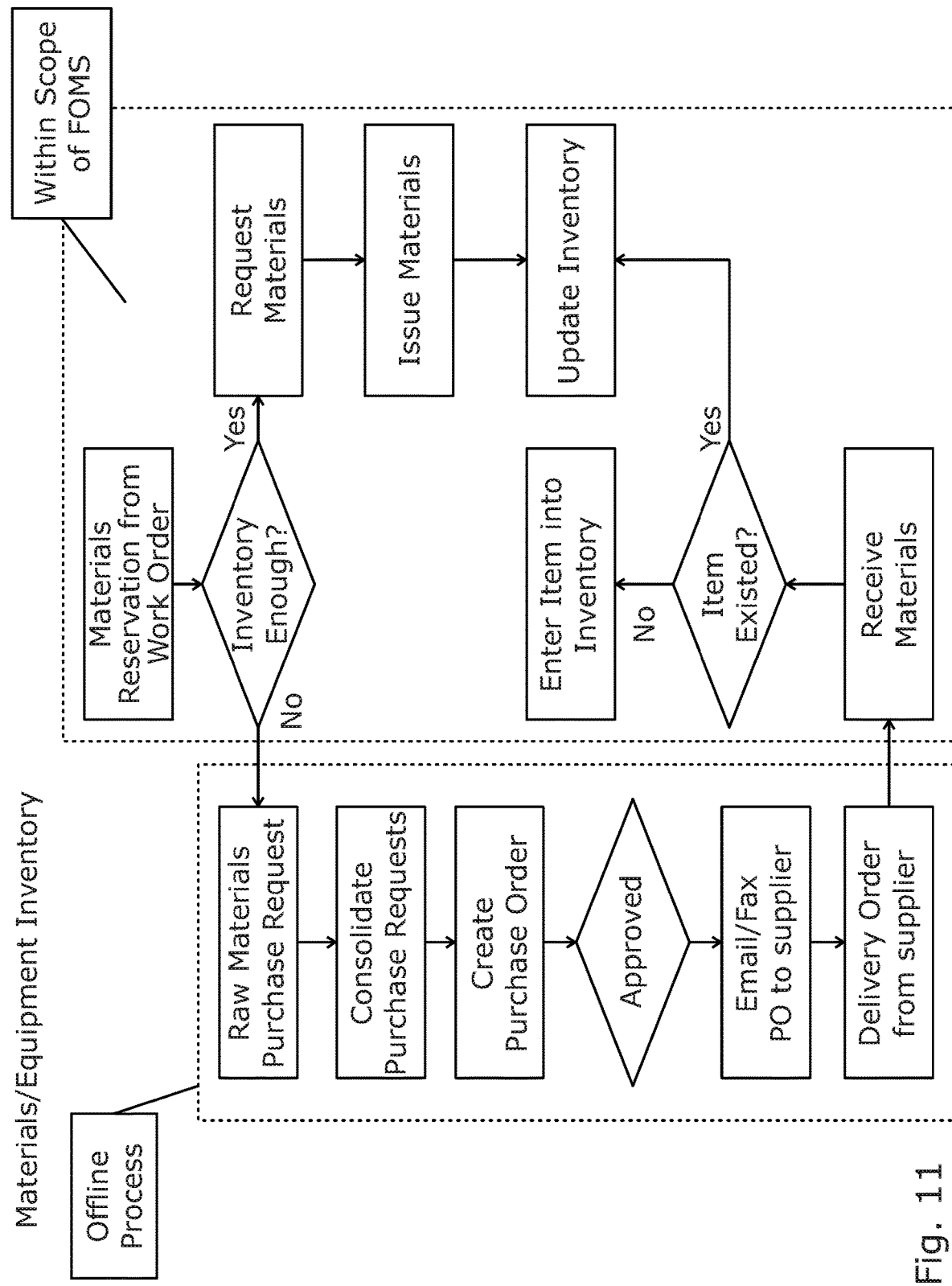
FIG. 11 is a flow chart showing the management of materials and/or equipment inventory by FOMS.
Figure 13:
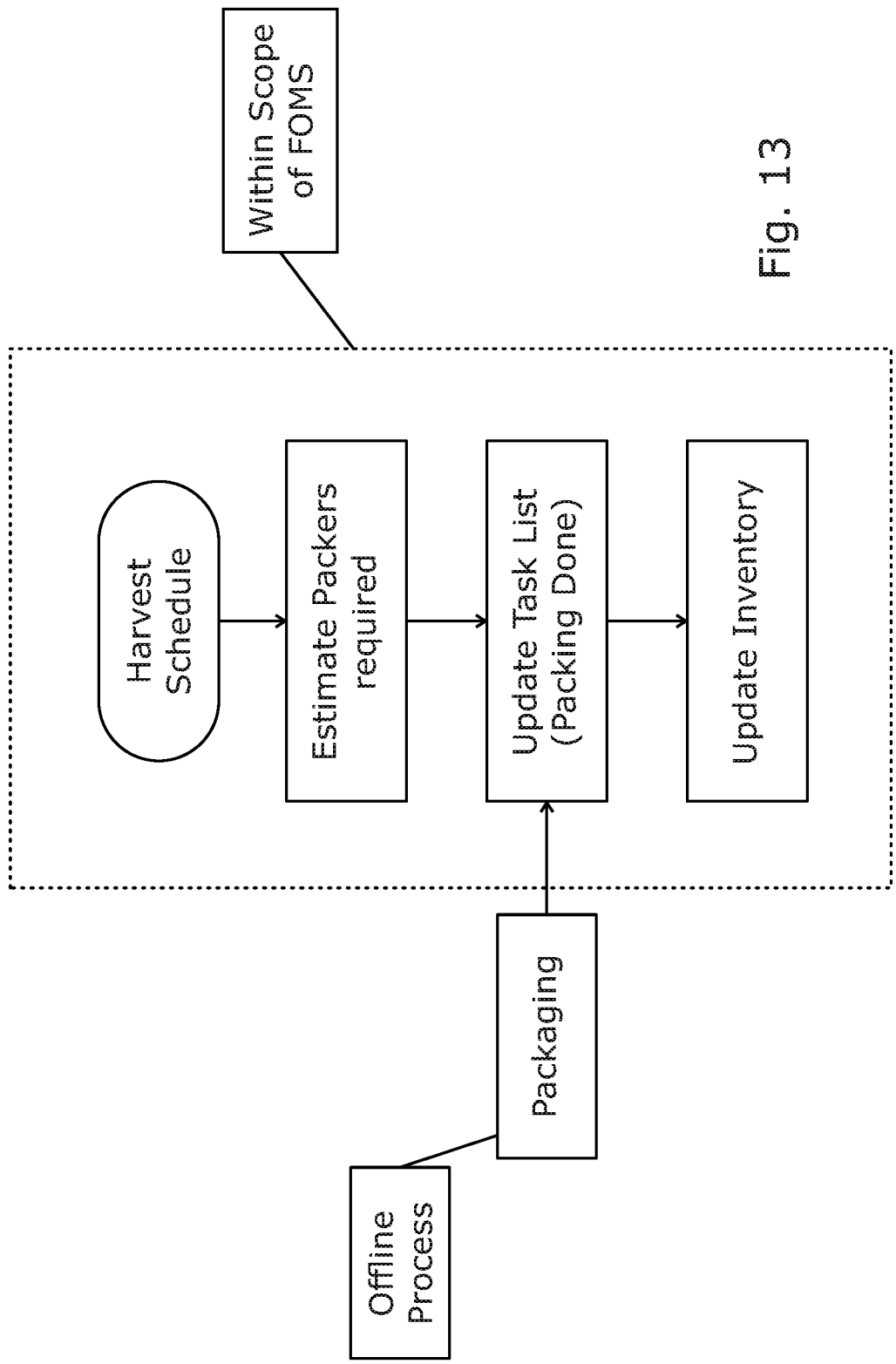
FIG. 13 is a flow chart showing the management of the finished goods inventory by FOMS.

In various embodiments, FOMS may also be programmed to detect for abnormalities and issue an alert to the operator. In various embodiments, FOMS may provide the operator with a corrective measure to rectify the abnormalities. For example, when there is a surge in demand for a particular type of plants which is depleting raw materials for growing that particular type of plant, such as tomatoes, the FOMS may issue an alert to the operator and recommend a corrective action such as "Please purchase more Tomato seeds". In various embodiments as shown in FIG. 11, FOMS may also integrate with suppliers for raw materials so that procurement of raw materials may be automated and managed dynamically according to consumer demand. For example when there is a surge in demand for tomatoes, the FOMS may automatically place order with the relevant suppliers for tomato seeds and the growth medium and nutrients suitable for growing tomatoes.

The present invention will now be described in greater technical detail relating to the process of operating the vertical farming system 100 for growing a plant. In various embodiments, there is an indoor vertical farming process 500 for growing plants. The vertical farming process 500 comprises the initial stage of germination 502 which involves the preparation of growth mediums and adding water and/or nutrients to the growth medium. Following which, a seeding machine sows seeds into the mediums and the seeds are soaked without lighting and nutrients. In this case, the seeds may sprout after a pre-determined number of days. The next stage is the seedling stage 504 in which the growth mediums together with the sprouted seeds are transferred into farming trays 404 which contain further nutrients. The farming trays 404 are subsequently mounted on the farming modules 106. The farming modules 106 containing the farming trays 404 with the sprouted seeds are then transported by the machines 108 to the 3D array of growth racks 104 for storage in which the sprouts are illuminated with LED lightings 406 for further growth into seedlings. The farming modules 106 may then be retrieved after a pre-determined number of days via the machines 108 for the next stage.

The next stage following the seedling stage may be the growth stage 506 in which the seedlings are transferred to growth farming trays 404 in which water and nutrients are added again. The automated retrieval system re-transports the farming modules 106 loaded with the growth farming trays 404 into the growth racks 104. The seedlings are further illuminated with LED lightings 406 that are installed on the farming modules 106 for further growth. After a pre-determined number of days, the vegetables that grow in the growth trays are ready for harvesting.

The next stage is the harvesting and packing stage 508 in which the automated retrieval system transports the farming trays 404 to the harvesting area via the machines 108 and the vegetables are checked for quality and the healthiest are selected, weighed and transported to the packing area. The packing machine then collects the vegetables before storing them in a cold room. The last stage is the delivery stage 510 in which the packed vegetables are loaded into trucks and delivered to retailers.

In various embodiments and as described above, the vertical farming process 500 may integrate upstream and is triggered when an order for a plant or vegetable is received from consumers via an order platform in communication with FOMS. In various embodiments, the vertical farming process 500 may integrate downstream taking into account the preference of the retailers or end consumers. For example, the harvesting process may be planned to take place near to the preferred delivery time of the retailers, ensuring that quality or freshness of the delivered plants or vegetables. In various embodiments as shown in FIG. 14, FOMS may also keep track of each delivery order and alert the operator if any delivery is delayed or is unsuccessful. Thereafter, the operator may rectify the unsuccessful delivery accordingly, either with or without suggestions provided by FOMS. In various embodiments, FOMS may also update the inventory as soon as the delivery is signed off and successful.

It should be further appreciated by the person skilled in the art that variations and combinations of features described above, not being alternatives or substitutes, may be combined to form yet further embodiments falling within the intended scope of the invention. In particular, Automation may be adopted in other production stages, leveraging the appropriate machineries for sowing of seeds, harvesting with a robotic arm, and packing of vegetables.

The vertical farm may be configured to grow a large variety of vegetables or plants, including but not limited to Pakchoy, Naibai, Chyesim, Romaine Lettuce, Butterhead Lettuce, Swiss Chard, Kale, Arugula, Basil, Cherry Tomatoes, Strawberry, rice (padi) and Japanese Cucumbers.

In various embodiments as shown in FIG. 18, farming resources (such as raw materials, growth racks, farming trays, farming modules) may be allocated for research and development (R&D). A research project may be initiated via FOMS which will verify if sufficient farming resources are available for the research project by checking with at least one inventory in the database. Thereafter, the research project may be executed and the progress may be automatically monitored by FOMS and the research results may be recorded in FOMS. In various embodiments, FOMS may be programmed to self-learn from the R&D results and continuously update the most optimal growth recipe for each plant variety for use in the next farming or production cycle.

The invention claimed is:

1. A system for indoor farming comprising:
at least one growth rack comprising a plurality of cells located in different regions of an indoor environment;
a plurality of farming modules, each farming module configured to be capable of being stored in a cell and capable of carrying a plurality of farming trays, each farming tray suitable for growing at least one type of plant through a germination, seedling or plant growth stage thereof and being self-contained without the need of water circulation and comprising:
a planting board having a plurality of holes defined thereon, the holes being spaced relatively apart depending on the germination, seedling or plant growth stage of the plant type each hole carrying a foam growth medium that can be impregnated with water and/or a liquid nutrient associated with the plant type sufficient to supply the plant type being grown though the germination, seedling or growth stage thereof without the need for further water and/or liquid nutrient to be supplied; and a main recess within which the planting board is capable of being fitted and held in place, wherein each farming module is capable of being one of transported to and transported from a cell located in a said region, and wherein each region is suitable for the germination, seedling or plant growth stage of the at least one type of plant being grown.

2. The system for indoor farming of claim 1, wherein the growth rack is a warehouse rack.

3. The system for indoor farming of claim 1 further comprising a machine arranged to transport a farming module, wherein the machine forms part of an automated retrieval system and is a storage and retrieval machine operable to travel along an aisle between two growth racks.

4. The system for indoor farming of claim 3, the system further comprising a sorting transport vehicle loop for serving as a loading and unloading bay for the farming module.

5. The system for indoor farming of claim 4, wherein the sorting transport vehicle loop receives each farming module and transports it to the automated retrieval mechanism.

6. The system for indoor farming of claim 3, wherein the machine is capable of transporting each farming module component along a longitudinal and lateral direction.

7. The system for indoor farming of claim 1, wherein the growth racks are installed with LED lighting over the farming tray, the LED lighting having a pre-determined distance from the farming tray.

8. The system for indoor farming of claim 7 wherein the distance between the LED lighting and the farming tray is adjustable.

9. The system for indoor farming of claim 1, each farming module comprising a frame for supporting a plurality of farming trays.

10. The system for indoor farming of claim 9, wherein the farming trays are spaced vertically apart.

11. The system for indoor farming of claim 1, further comprising an automated retrieval system for arranging the one or more farming modules on the growth rack in accordance with timing of placing the farming module on the growth rack.

12. The system for indoor farming of claim 1, further comprising a machine capable of transporting the farming module from the growth rack based on the time the farming module is placed on the growth rack.

13. The system for indoor farming of claim 1, wherein the system comprises a growth area, and wherein the system further comprises a hall having a plurality of floor levels for the processing and/or growth of the at least one type of plant growing in the one or more farming trays, wherein the hall is positioned adjacent to the growth area.

14. A process for indoor farming comprising the steps of sowing and sprouting a seed associable with a type of plant in a farming tray of a first farming module, each farming tray being suitable for growing at least one type of plant through a germination, seedling or plant growth stage thereof and being self-contained without the need of water circulation, wherein the farming tray comprises:

a planting board having a plurality of holes defined thereon, the holes being spaced relatively apart depending on the germination, seedling or plant growth stage of the plant type, each hole carrying a foam growth medium that can be impregnated with water and/or a liquid nutrient associated with the plant type sufficient to supply the plant type being grown though a germination, seedling or plant growth stage thereof without the need for further water and/or liquid nutrient to be supplied; and a main recess within which the planting board is capable of being fitted and held in place;

transplanting the sprouted seed to a farming tray of a second farming module, wherein the farming tray comprises:

a planting board having a plurality of holes defined thereon, the holes being spaced relatively apart depending on the germination, seedling or plant growth stage of the plant type, each hole carrying a foam growth medium that can be impregnated with water and/or a liquid nutrient associated with the plant type sufficient to supply the plant type being grown though a growth stage thereof; and a main recess within which the planting board is capable of being fitted and held in place, filling each of the farming trays with the water and/or liquid nutrient specific to the growth of the type of plant, wherein each of the first and second farming modules is capable of being one of transported to and transported from a cell of a growth rack located in different regions of an indoor environment, and wherein each region is suitable for the germination, seedling or plant growth stage of the at least one type of plant being grown.

\* \* \* \* \*